(12) United States Patent
Katsuno et al.

(10) Patent No.: US 7,268,097 B2
(45) Date of Patent: Sep. 11, 2007

(54) DESULFURIZING AGENT FOR HYDROCARBON DERIVED FROM PETROLEUM, METHOD FOR PRODUCING HYDROGEN FOR USE IN FUEL CELL AND METHOD FOR PRODUCING NICKEL-BASED DESULFURIZING AGENT

(75) Inventors: Hisashi Katsuno, Chiba (JP); Satoshi Matsuda, Chiba (JP); Kazuhito Saito, Chiba (JP); Masahiro Yoshinaka, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 514 days.

(21) Appl. No.: 10/221,199

(22) PCT Filed: Apr. 2, 2001

(86) PCT No.: PCT/JP01/02861

§ 371 (c)(1),
(2), (4) Date: Sep. 23, 2002

(87) PCT Pub. No.: WO01/72417

PCT Pub. Date: Oct. 4, 2001

(65) Prior Publication Data

US 2003/0113258 A1 Jun. 19, 2003

(30) Foreign Application Priority Data

| Mar. 31, 2000 | (JP) | ............................ 2000-096487 |
| Mar. 31, 2000 | (JP) | ............................ 2000-096490 |
| Jul. 14, 2000 | (JP) | ............................ 2000-214145 |
| Jul. 14, 2000 | (JP) | ............................ 2000-214146 |
| Jul. 14, 2000 | (JP) | ............................ 2000-214147 |

(51) Int. Cl.
*B01J 21/00* (2006.01)
*B01J 23/32* (2006.01)
*C01B 3/26* (2006.01)
*C01B 3/02* (2006.01)
*C01B 17/34* (2006.01)

(52) U.S. Cl. ...................... 502/259; 502/243; 502/244; 502/245; 502/250; 502/254; 502/261; 502/263; 502/324; 502/333; 502/334; 502/337; 502/339; 502/345; 502/347; 502/400; 502/406; 502/407; 502/415; 502/517; 423/651; 423/653; 423/648.1; 423/650; 423/654; 208/217; 208/226; 208/244; 208/246

(58) Field of Classification Search ................ 502/259, 502/243–245, 250, 254, 261, 263, 324, 333, 502/334, 345, 337, 339, 347, 400, 406, 407, 502/415, 517; 423/648.1, 650, 651, 653, 423/654; 208/217, 226, 244, 246

See application file for complete search history.

(56) References Cited

U.S. PATENT DOCUMENTS

| 2,921,971 | A | | 1/1960 | Holm et al. |
| 2,951,034 | A | | 8/1960 | Stuart et al. |
| 3,737,291 | A | * | 6/1973 | Lhonore et al. ............ 208/134 |
| 4,631,265 | A | | 12/1986 | Oudejans et al. |
| 5,026,536 | A | * | 6/1991 | Shioiri et al. ................ 423/652 |
| 5,130,115 | A | | 7/1992 | Fujisou et al. ............. 423/652 |
| 5,356,847 | A | * | 10/1994 | Henderson ................... 502/84 |
| 5,759,947 | A | | 6/1998 | Zhou |
| 5,800,798 | A | * | 9/1998 | Ino et al. ..................... 423/654 |
| 6,245,709 | B1 | * | 6/2001 | Clark et al. ................. 502/326 |
| 6,306,289 | B1 | * | 10/2001 | Hayashi et al. ............. 208/264 |
| 6,683,024 | B1 | * | 1/2004 | Khare et al. ................ 502/400 |

(Continued)

FOREIGN PATENT DOCUMENTS

EP 0 097 047 A2 12/1983

(Continued)

OTHER PUBLICATIONS

D. J. C. Yates, et al., "Catalysis over Supported Metals. I. Kinetics of Ethane Hydrogenolysis over Nickel Surfaces of Known Area", Journal of the American Chemical Society, vol. 86, XP-002320989, pp. 2996-3001, 1964.

*Primary Examiner*—J. A. Lorengo
*Assistant Examiner*—Patricia L. Hailey
(74) *Attorney, Agent, or Firm*—Oblon, Spivak, McClelland, Maier & Neustadt, P.C.

(57) ABSTRACT

A desulfurizing agent comprising a silica-alumina carrier having an Si/Al mole ratio of 10 or less and nickel carried thereon; a desulfurizing agent for hydrocarbons derived from petroleum which comprises a carrier and a metal component carried thereon and has a specific surface area of pores having a pore diameter of 3 nm or less of 100 m²/g or more; an Ni-Cu based desulfurizing agent comprising a carrier and, carried thereon, (A) nickel, (B) copper, and (C) an alkali metal or another metal; a desulfurizing agent for hydrocarbons derived from petroleum which comprises a carrier and a metal component carried thereon and has a hydrogen adsorption capacity of 0.4 mmol/g or more; and methods for producing these nickel-based and nickel-copper-based desulfurizing agents. The above desulfurizing agents are capable of adsorbing and removing with good efficiency the sulfur contained in hydrocarbons derived from petroleum to a content of 0.2 wt. ppm or less and have a long service life. The steam reforming of hydrocarbons derived from petroleum having been desulfurized by use of any one of the above desulfurizing agents allows the production of hydrogen for use in a fuel cell with good efficiency.

22 Claims, No Drawings

U.S. PATENT DOCUMENTS

| | | | |
|---|---|---|---|
| 6,875,410 B2 * | 4/2005 | Satokawa et al. | 423/244.1 |
| 2001/0027163 A1 * | 10/2001 | Khare | 502/400 |
| 2004/0063576 A1 * | 4/2004 | Weston et al. | 502/250 |

FOREIGN PATENT DOCUMENTS

| | | |
|---|---|---|
| EP | 565025 | 10/1993 |
| EP | 1 101 530 A1 | 5/2001 |
| JP | 7-194976 | 8/1995 |
| JP | 8-196907 | 8/1996 |
| JP | 2000-42408 | 2/2000 |
| JP | 0 992 285 | 4/2000 |
| WO | WO99/47256 | 9/1999 |

\* cited by examiner

DESULFURIZING AGENT FOR HYDROCARBON DERIVED FROM PETROLEUM, METHOD FOR PRODUCING HYDROGEN FOR USE IN FUEL CELL AND METHOD FOR PRODUCING NICKEL-BASED DESULFURIZING AGENT

TECHNICAL FIELD

The present invention relates to a desulfurizing agent for petroleum-derived hydrocarbons, to a method for producing hydrogen for use in fuel cells, and to a method for producing a nickel-based desulfurizing agent. More particularly, the invention relates to a long-service-life desulfurizing agent for effectively removing sulfur contained in petroleum-derived hydrocarbons to a low concentration; to a method for producing hydrogen for use in fuel cells, the method comprising steam-reforming petroleum-derived hydrocarbons which have been desulfurized by use of the desulfurizing agent; and to a method for effectively producing a nickel-based desulfurizing agent exhibiting the above-mentioned excellent performance.

BACKGROUND ART

In recent years, new energy-production techniques have attracted attention from the standpoint of environmental issues, and among these techniques a fuel cell has attracted particular interest. The fuel cell converts chemical energy to electric energy through electrochemical reaction of hydrogen and oxygen, attaining high energy utilization efficiency. Therefore, extensive studies have been carried out on realization of fuel cells for public use, industrial use, automobile use, etc.

Fuel cells are categorized in accordance with the type of employed electrolyte, and, among others, a phosphate type, a fused carbonate salt type, a solid oxide type, and a solid polymer type have been known. With regard to hydrogen sources, studies have been conducted on methanol; liquefied natural gas predominantly containing methane; city gas predominantly containing the natural gas; a synthetic liquid fuel produced from natural gas serving as a raw material; and petroleum-derived hydrocarbons such as LPG, naphtha, and kerosene.

Among the aforementioned petroleum-derived hydrocarbons, kerosene is easy to store and handle, and infrastructure of a supply system for kerosene is well developed (e.g., gas stations and shops). Thus, kerosene would advantageously serve as a hydrogen source for use in fuel cells for public use, automobile use, etc.

However, as compared with methanol and natural gas, petroleum-derived hydrocarbons problematically have a high sulfur content. In order to produce hydrogen from petroleum-derived hydrocarbons, the hydrocarbons are generally subjected to steam reforming or partial oxidation reforming in the presence of a reforming catalyst. In the course of such reformation, the reforming catalyst is poisoned by sulfur contained in the hydrocarbons. Therefore, from the viewpoint of catalyst life, the hydrocarbons are essentially subjected to desulfurization so as to control the sulfur content to generally 0.2 ppm by weight or lower.

Conventionally, a variety of studies have been carried out on methods for desulfurizing petroleum-derived hydrocarbons. Among them, one known method is hydro-desulfurization by use of a hydro-desulfurization catalyst such as Co-Mo/alumina or Ni-Mo/alumina and a hydrogen sulfide adsorbent such as ZnO, the hydro-desulfurization being effected under normal pressure to 5 MPa and at 200-400° C. However, the above method is directed to removal of sulfur by transformation into hydrogen sulfide through hydro-desulfurization performed under rigorous conditions, and controlling the sulfur content to 0.2 ppm by weight or lower is difficult. Thus, application of the method to desulfurizing petroleum-derived hydrocarbons for use in fuel cells is not encouraged.

From another viewpoint, there have been known nickel-based adsorbents and nickel-copper-based adsorbents serving as desulfurizing agents which can remove sulfur contained in petroleum-derived hydrocarbons through adsorption under mild conditions, without performing hydrorefining, thereby controlling the sulfur content to 0.2 ppm by weight or lower [Japanese Patent Publication (kokoku) Nos. 6-65602, 7-115842, and 7-115843 and Japanese Patent Application Laid-Open (kokai) Nos. 1-188405, 2-275701, 2-204301, 5-70780, 6-80972, 6-91173, and 6-228570 (nickel adsorbents), and Japanese Patent Application Laid-Open (kokai) No. 6-315628 (nickel-copper adsorbent)].

These nickel-based adsorbents and nickel-copper-based adsorbents are advantageously applied, as desulfurizing agents, to petroleum-derived hydrocarbons for use in fuel cells. However, the service life of these adsorbents is still unsatisfactory for use in practice, and conditions for designing adsorbents suitable for desulfurizing petroleum-derived hydrocarbon have not yet been elucidated. Particularly, the above nickel-copper-based adsorbents exhibit unsatisfactory performance for effective desulfurization.

DISCLOSURE OF THE INVENTION

In view of the foregoing, a first object of the present invention is to provide an industrially advantageous desulfurizing agent for petroleum-derived hydrocarbon, the agent having a long service life for effectively removing sulfur contained in petroleum-derived hydrocarbons to 0.2 ppm by weight or lower. A second object of the invention is to provide a method for producing hydrogen for use in fuel cells, the method comprising steam-reforming petroleum-derived hydrocarbons which have been desulfurized by use of the desulfurizing agent. A third object of the invention is to provide a method for producing an industrially advantageous nickel-based or nickel-copper-based desulfurizing agent having a long service life for effectively removing to a remarkably low concentration sulfur contained in petroleum-derived hydrocarbons.

The present inventors have carried out extensive studies in order to attain the above objects, and have found that the first object can be attained by provision of any of the following desulfurizing agents for petroleum-derived hydrocarbons; i.e., a desulfurizing agent comprising a silica-alumina carrier having a specific composition and nickel carried on the carrier; a desulfurizing agent comprising a carrier and a metallic component carried on the carrier and having a specific pore size distribution; a desulfurizing agent comprising a silica-alumina carrier and, carried thereon, nickel, copper, and at least one species selected from among an alkali metal, an alkaline earth metal, a transition metal, a noble metal, and a rare earth element; and a desulfurizing agent having a hydrogen adsorption capacity not lower than a predetermined value. The inventors have also found that steam reformation of petroleum-derived hydrocarbons which have been desulfurized by use of any one of the above desulfurizing agents can effectively produce hydrogen for use in fuel cells, thereby attaining the second object of the present invention.

The inventors have also found that the third object of the present invention can be attained by mixing an acidic aqueous solution or an acidic dispersion containing a nickel source and an aluminum source, with a basic aqueous solution containing a silicon source, or by mixing an acidic aqueous solution or an acidic dispersion containing a nickel source, a copper source, and a carrier, with a basic aqueous solution containing an inorganic base, to thereby form a solid; and calcinating the solid.

The present invention has been accomplished on the basis of these findings.

Accordingly, the present invention provides the following:

(1) a desulfurizing agent comprising a silica-alumina carrier and at least nickel carried on the carrier, characterized in that the silica-alumina carrier has an Si/Al mole ratio of 10 or less (hereinafter referred to as desulfurizing agent I);

(2) a desulfurizing agent for petroleum-derived hydrocarbons comprising a silica-alumina carrier and at least nickel carried on the carrier, characterized by having a specific surface area of pores having a diameter of 3 nm or less of 100 $m^2/g$ or more (hereinafter referred to as desulfurizing agent II);

(3) a nickel-copper-based desulfurizing agent comprising a silica-alumina carrier and, carried on the carrier, (A) nickel, (B) copper, and (C) at least one species selected from among an alkali metal, an alkaline earth metal, a transition metal, a noble metal, and a rare earth element (hereinafter referred to as desulfurizing agent III);

(4) a desulfurizing agent for petroleum-derived hydrocarbons comprising a silica-alumina carrier and at least nickel carried on the carrier, characterized by having a hydrogen adsorption capacity of at least 0.4 mmol/g (hereinafter referred to as desulfurizing agent IV);

(5) a method for producing hydrogen for use in a fuel cell characterized by comprising desulfurizing a petroleum-derived hydrocarbon by use of the aforementioned desulfurizing agent I, II, III, or IV and, subsequently, bringing the desulfurized product into contact with a steam-reforming catalyst;

(6) a method for producing a nickel-based desulfurizing agent, the desulfurizing agent comprising a silica-alumina carrier and nickel carried on the carrier, characterized by comprising mixing an acidic aqueous solution or an acidic dispersion having a pH of 2 or less and containing a nickel source and an aluminum source, with a basic aqueous solution containing a silicon source and an inorganic base, to thereby form a solid; collecting the solid; and calcinating the solid (hereinafter referred to as production method I);

(7) a method for producing a nickel-copper-based desulfurizing agent, the desulfurizing agent comprising a silica-alumina carrier and, carried on the carrier, nickel and copper, characterized by comprising mixing an acidic aqueous solution or an acidic aqueous dispersion having a pH of 2 or less and containing a nickel source, a copper source, and a carrier, with a basic aqueous solution containing an inorganic base, to thereby form a solid; collecting the solid; and calcinating the solid (hereinafter referred to as production method II-a); and (8) a method for producing a nickel-copper-based desulfurizing agent, the desulfurizing agent comprising a silica-alumina carrier and, carried on the carrier, nickel and copper, characterized by comprising mixing an acidic aqueous solution or an acidic aqueous dispersion having a pH of 2 or less and containing a nickel source, a copper source, and a carrier, with a basic aqueous solution containing an inorganic base and a carrier, to thereby form a solid; collecting the solid; and calcinating the solid (hereinafter referred to as production method II-b).

BEST MODE FOR CARRYING OUT THE INVENTION

The desulfurizing agent I of the present invention comprises a silica-alumina carrier having an Si/Al mole ratio of 10 or less and nickel carried on the carrier.

When the Si/Al mole ratio of the silica-alumina carrier of the desulfurizing agent I is in excess of 10, the produced desulfurizing agents exhibit unsatisfactory desulfurization performance. Preferably, the Si/Al mole ratio is selected from the range of 0.1-8. Generally, the amount of nickel carried on the carrier is preferably 40 wt.% or more (as reduced to metallic nickel) based on the weight of the entirety of the desulfurizing agent.

When the amount of nickel is less than 40 wt.%, the desulfurizing agent may fail to attain sufficient desulfurization performance, whereas when the amount is excessively large, the proportion of the carrier decreases, causing reduction in mechanical strength and desulfurization performance of the desulfurizing agent. The amount of metallic nickel carried on the carrier more preferably falls within a range of 50-70 wt.%, in consideration of factors such as mechanical strength and desulfurization performance.

The method for producing the above-described desulfurizing agent I will be described in detail hereinbelow.

The desulfurizing agent II for petroleum-derived hydrocarbons of the present invention comprises a carrier and a metallic component carried on the carrier, and has a specific surface area of pores having a diameter of 3 nm or less of 100 $m^2/g$ or more.

The research carried out by the present inventors supports that there exists a certain level of correlation between the total surface area of a desulfurizing agent and desulfurization performance thereof. In fact, clear correlation has been confirmed between the surface area of pores having a diameter of 3 nm or less and desulfurization performance.

The desulfurizing agent II employed in the present invention must have a specific surface area of pores having a diameter of 3 nm or less of 100 $m^2/g$ or more. When the specific surface area of the pores is less than 100 $m^2/g$, dispersibility of the metallic component serving as an active desulfurization component becomes insufficient, possibly causing insufficient desulfurization performance. Although no particular limitation is imposed on the upper limit of the specific surface area of the pores, a carrier having an excessively large specific surface area of the pores is difficult to produce. Therefore, the specific surface area of pores having a diameter of 3 nm or less is preferably 100-250 $m^2/g$, more preferably 120-220 $m^2/g$, from the viewpoints of desulfurization performance and ease of production.

The aforementioned specific surface area of pores having a diameter of 3 nm or less and the BET value are determined through the following methods:

(1) The BET specific surface area is measured through the $N_2$ adsorption method.

(2) The specific surface area of pores having a diameter of 3 nm or less is calculated by analyzing the $N_2$ adsorption isotherm through the BJH method.

According to the present invention, the carrier is preferably a porous carrier, more preferably a porous inorganic oxide. Examples of the carrier include silica, alumina, silica-alumina, titania, zirconia, magnesia, zinc oxide, terra alba, clay, and diatomaceous earth. These oxides may be used singly or in combination of two or more species. Of these, silica-alumina is particularly preferred.

Among the metallic components to be carried on the carrier, nickel and/or copper are particularly preferred. In addition to nickel and/or copper, other metals such as cobalt, iron, manganese, and chromium may be co-present in small amounts in accordance with needs.

In the present invention, the amount of nickel carried on the carrier is preferably 40 wt.% or more (as reduced to metallic nickel) based on the weight of the entirety of the desulfurizing agent. When the amount of nickel is less than 40 wt.%, the desulfurizing agent may fail to attain sufficient desulfurization performance, whereas when the amount is excessively large, the proportion of the carrier decreases, causing reduction in mechanical strength and desulfurization performance of the desulfurizing agent. The amount of metallic nickel carried on the carrier more preferably falls within a range of 50-70 wt.%, in consideration of factors such as mechanical strength and desulfurization performance. In the case in which copper is caused to be carried on the carrier in addition to nickel, the amount of copper carried on the carrier is preferably 5-50 wt.% (as reduced to metallic copper), more preferably 10-35 wt.%, based on the weight of the entirety of the desulfurizing agent. When the amount of copper is less than 5 wt.%, the sulfur adsorption rate may decrease, whereas when the amount of copper is in excess of 50 wt.%, the sulfur adsorption capacity may decrease. In the case in which nickel and copper are caused to be carried on the carrier, the total amount thereof (as metals) is preferably 60-90 wt.%, more preferably 60-80 wt.%, based on the weight of the entirety of the desulfurizing agent.

No particular limitation is imposed on the method for carrying a metallic component on the carrier, and any of known methods such as impregnation, co-precipitation, and kneading can be employed.

The desulfurizing agent comprising a silica-alumina carrier and nickel carried on the carrier and the desulfurizing agent comprising a silica-alumina carrier and nickel and copper carried on the carrier, which are preferred desulfurizing agents according to the present invention, can be produced through, for example, the co-precipitation method described below.

According to the co-precipitation method, an acidic aqueous solution or an acidic aqueous dispersion containing a nickel source, an aluminum source, and an optional copper source is prepared, along with a basic solution containing a silicon source and an inorganic base. Examples of the nickel source incorporated into the acidic aqueous solution or acidic aqueous dispersion include nickel chloride, nickel nitrate, nickel sulfate, nickel acetate, and hydrates thereof. Examples of the copper source include copper chloride, copper nitrate, copper sulfate, copper acetate, and hydrates thereof. Examples of the aluminum source include aluminum nitrate; alumina hydrates such as pseudoboehmite, boehmite alumina, bayerite, and gibbsite; and y-alumina.

No particular limitation is imposed on the species of the silicon source incorporated into the basic solution, and any materials may be employed so long as the materials are soluble in an aqueous alkaline solution and form silica through calcinating. Examples of the silicon source include orthosilicic acid, metasilicic acid, sodium salts thereof, potassium salts thereof, and water glass. Examples of the inorganic base include alkali metal carbonates and alkali metal hydroxides.

Subsequently, the thus-prepared basic solution and the thus-prepared acidic aqueous solution or acidic aqueous dispersion are heated individually at approximately 50-90° C., and the two liquids are mixed together. The resultant mixture is maintained at approximately 50-90° C., to thereby complete reaction.

The thus-formed solid is thoroughly washed, followed by solid-liquid separation, or alternatively, the solid is subjected to solid-liquid separation, followed by thorough washing. The treated solid is dried at approximately 80-150° C. through a known method, and the dried product is calcined at preferably 200-400° C., to thereby yield a desulfurizing agent containing a metallic component carried on a silica-alumina carrier. The type and amounts of materials to be employed, reaction conditions, calcination conditions, etc. are chosen such that the aforementioned pore size distribution is imparted to the carrier and the amount of metal carried on the carrier is controlled to a desired value.

The nickel-copper-based desulfurizing agent III of the present invention comprises a carrier and, as metals carried on the carrier, (A) nickel, (B) copper, and (C) at least one species selected from among an alkali metal, an alkaline earth metal, a transition metal, a noble metal, and a rare earth element. The amount of nickel and that of copper carried on the carrier are preferably 40-80 wt.% (as reduced to metallic nickel) and 5-50 wt.% (as reduced to metallic copper), respectively, based on the weight of the entirety of the desulfurizing agent. When the amount of nickel or that of copper is less than the corresponding range, desulfurizing agent may fail to attain sufficient desulfurization performance, whereas when the amount is excessively large, the proportion of the carrier decreases, causing reduction in mechanical strength and desulfurization performance of the desulfurizing agent. The amount of nickel carried on the carrier more preferably falls within a range of 50-70 wt.%, and the amount of copper carried on the carrier more preferably falls within a range of 10-35 wt.%, in consideration of factors such as mechanical strength and desulfurization performance.

In the desulfurizing agent III of the present invention, at least one species selected from among an alkali metal, an alkaline earth metal, a transition metal, a noble metal, and a rare earth element is caused to be carried on the carrier as a third metallic component.

Examples of preferred alkali metals include potassium and sodium. Examples of preferred alkaline earth metals include calcium and magnesium. Examples of preferred transition metals include manganese and zinc. Examples of preferred noble metals include platinum, gold, silver, palladium, ruthenium, and rhodium. Examples of preferred rare earth elements include lanthanum and cerium.

The amounts of the alkali metal, that of the alkaline earth metal, that of the transition metal, that of the noble metal, and that of the rare earth element, each carried on the carrier are preferably 1-10 wt.%, 1-10 wt.%, 2-10 wt.%, 0.1-5 wt.%, and 3-10 wt.%, respectively. When the amounts of metals serving as the third metallic component fall outside the above ranges, desulfurization performance may be unsatisfactory.

The carrier for carrying these metals is at least one species selected from among silica, alumina, silica-alumina, titania, zirconia, zeolite, magnesia, diatomaceous earth, terra alba, clay, and zinc oxide. Of these, silica-alumina is preferred, with a silica-alumina carrier having an Si/Al mole ratio of 10 or less being particularly preferred from the viewpoint of desulfurization performance and other factors.

In the desulfurizing agent III of the present invention, the total amount of metals carried on the carrier is preferably 70-90 wt.%, and the carrier content is preferably 30-10 wt.%, from the viewpoints of desulfurization performance, mechanical strength of the desulfurizing agent, and other factors.

No particular limitation is imposed on the method for producing the Ni-Cu-based desulfurizing agent III of the present invention, and any method can be employed so long as the method can produce a desulfurizing agent having the aforementioned characteristics. For example, a desired Ni-Cu-based desulfurizing agent III can be effectively produced through the following method.

Firstly, there are prepared an acidic aqueous solution or dispersion having a pH of 2 or lower and containing a nickel source, a copper source, and an aluminum source and a basic aqueous solution containing a silicon source and an inorganic base. Examples of the nickel source employed for preparing the acidic aqueous solution or dispersion include nickel chloride, nickel nitrate, nickel sulfate, nickel acetate, nickel carbonate, and hydrates thereof. Examples of the copper source include copper chloride, copper nitrate, copper sulfate, copper acetate, and hydrates thereof. These nickel sources and copper sources may be used singly or in combination of two or more species.

Examples of the aluminum source include γ-alumina and alumina hydrates such as pseudoboehmite, boehmite alumina, bayerite, and gibbsite. Of these, pseudoboehmite, boehmite alumina, and γ-alumina are preferred. These sources of powder form and sol form may be used. These aluminum sources may be used singly or in combination of two or more species.

The pH of the above aqueous solution or dispersion containing the nickel source and aluminum source must be adjusted to 2 or less by use of an acid such as hydrochloric acid, sulfuric acid, and nitric acid. When the pH is higher than 2, a desulfurizing agent having desired performance is difficult to obtain. Although no particular limitation is imposed on the solid concentration of the aqueous solution or dispersion, the concentration is suitably approximately 5-20 wt.%.

No particular limitation is imposed on the species of the silicon source incorporated into the basic solution, and any materials may be employed so long as the materials are soluble in an aqueous alkaline solution and form silica through calcinating. Examples of the silicon source include orthosilicic acid, metasilicic acid, sodium salts thereof, potassium salts thereof, and water glass. These species may be used singly or in combination of two or more species. Of these, water glass, a type of sodium silicate hydrate, is particularly preferred. Generally, the amount of the silicon source employed is preferably predetermined such that the mole ratio of silicon atoms contained in the silicon source to aluminum atoms contained in the aluminum source (Si/Al mole ratio) is 10 or less.

Examples of preferred inorganic bases include alkali metal carbonates and alkali metal hydroxides; e.g., sodium carbonate, potassium carbonate, sodium hydroxide, and potassium hydroxide. These inorganic bases may be used singly or in combination of two or more species. Among them, the sole use of sodium carbonate or a combination of sodium carbonate and sodium hydroxide is particularly preferred. Preferably, the amount of the inorganic base is determined in advance such that in the subsequent step a mixture of the basic aqueous solution containing the base and the aforementioned acidic aqueous solution or dispersion having a pH of 2 or less becomes substantially neutral to basic.

The entire amount of the inorganic base may be employed for preparing the basic solution. Alternatively, a portion of the inorganic base may be separately added to the mixture prepared by mixing the aforementioned acidic aqueous solution or dispersion and the basic solution.

According to the present invention, the thus-prepared acidic aqueous solution or dispersion having a pH of 2 or less and the basic aqueous solution are individually heated to approximately 50-90° C., followed by mixing two liquid together. The mixing is preferably performed as instantaneously as possible. After completion of mixing, an optional aqueous solution containing the inorganic base and heated to 50-90° C. is added to the mixture, and the resultant mixture is stirred for about 0.5-3 hours at about 50-90° C., to thereby complete reaction.

The thus-formed solid is thoroughly washed, followed by solid-liquid separation, or alternatively, the solid is subjected to solid-liquid separation, followed by thorough washing. The treated solid is dried at approximately 80-150° C. through a known method, and the dried product is calcined at preferably 200-400° C., to thereby yield a desulfurizing agent containing nickel and copper carried on a carrier. When the calcination temperature falls outside the above range, an Ni-Cu-based desulfurizing agent exhibiting desired performance is difficult to obtain.

The method for carrying the aforementioned third metallic component selected from among an alkali metal, an alkaline earth metal, a transition metal, a noble metal, and a rare earth element may be appropriately selected from several methods depending on the metal species. For example, a source of the alkali metal, alkaline earth metal, transition metal, noble metal, or rare earth element is added to the acidic aqueous solution or dispersion containing the nickel source, copper source, and aluminum source and having a pH of 2 or less, and the mixture is reacted. Alternatively, the source in powder form may be present during calcinating for reaction. Yet alternatively, an impregnation liquid containing the source may be carried on the carrier. In the above methods, the amount of the third component source may be appropriately predetermined such that the amount of the third component carried on the carrier falls within the above range. The sources of the alkali metal, alkaline earth metal, transition metal, noble metal, and rare earth element are selected from the corresponding carbonates, chlorides, nitrates, sulfates, acetates, etc. in accordance with the carrying method.

The desulfurizing agent IV of the present invention for petroleum-derived hydrocarbons comprising a carrier and a metallic component carried on the carrier, characterized by having a hydrogen adsorption capacity of at least 0.4 mmol/g. When the hydrogen adsorption capacity of is less than 0.4 mmol/g, an object of the present invention cannot be attained due to unsatisfactory desulfurization. No particular limitation is imposed on the upper limit of the hydrogen adsorption capacity. However, since a desulfurizing agent having an excessively large hydrogen adsorption capacity is difficult to produce, the hydrogen adsorption capacity is preferably 0.4-0.9 mmol/g, more preferably 0.6-0.8 mmol/g, from the viewpoints of desulfurization performance and production difficulty.

The above-described hydrogen adsorption capacity is a value measured through the following procedure.

Specifically, a desulfurizing agent (100 mg) is charged into a quartz-made test tube and heated to 120° C. under ambient pressure in a helium flow. After maintenance for one hour, helium gas was substituted by hydrogen gas, and the agent is further heated and maintained at 380° C. for one hour, to thereby activate the desulfurizing agent. Subsequently, hydrogen adsorbed by the desulfurizing agent is removed at 300° C. under vacuum (0.4 Pa), and hydrogen adsorption is measured at 20° C. The hydrogen adsorption capacity was calculated from the change in pressure of fed hydrogen.

According to the present invention, the carrier is preferably a porous carrier, more preferably a porous inorganic oxide. Examples of the carrier include silica, alumina, silica-alumina, titania, zirconia, magnesia, zinc oxide, terra alba, clay, and diatomaceous earth. These oxides may be used singly or in combination of two or more species. Of these, silica-alumina is particularly preferred.

Among the metallic components to be carried on the carrier, nickel is particularly preferred. In addition to nickel, other metals such as copper, cobalt, iron, manganese, and chromium may be co-present in small amounts in accordance with needs.

In the present invention, the amount of nickel carried on the carrier is preferably 40 wt.% or more (as reduced to metallic nickel) based on the weight of the entirety of the desulfurizing agent. When the amount of nickel is less than 40 wt.%, the desulfurizing agent may fail to attain sufficient desulfurization performance, whereas when the amount is excessively large, the proportion of the carrier decreases, causing reduction in mechanical strength and desulfurization performance of the desulfurizing agent. The amount of metallic nickel carried on the carrier more preferably falls within a range of 50-70 wt.%, in consideration of factors such as mechanical strength and desulfurization performance.

No particular limitation is imposed on the method for carrying a metallic component on the carrier, and any of known methods such as impregnation, co-precipitation, and kneading can be employed.

The desulfurizing agent comprising an alumina-silica carrier and nickel carried on the carrier, which is a preferred desulfurizing agent according to the present invention, can be produced through, for example, the co-precipitation method described below.

According to the co-precipitation method, an acidic aqueous solution or an acidic aqueous dispersion containing a nickel source and an aluminum source is prepared, along with a basic solution containing a silicon source and an inorganic base. Examples of the nickel source incorporated into the acidic aqueous solution or acidic aqueous dispersion include nickel chloride, nickel nitrate, and nickel sulfate, and hydrates thereof. Examples of the aluminum source include aluminum nitrate; alumina hydrates such as pseudo-boehmite, boehmite alumina, bayerite, and gibbsite; and γ-alumina.

No particular limitation is imposed on the species of the silicon source incorporated into the basic solution, and any materials may be employed so long as the materials are soluble in an aqueous alkaline solution and form silica through calcinating. Examples of the silicon source include orthosilicic acid, metasilicic acid, sodium salts thereof, potassium salts thereof, and water glass. Examples of the inorganic base include alkali metal carbonates and alkali metal hydroxides.

Subsequently, the thus-prepared basic solution and the thus-prepared acidic aqueous solution or acidic aqueous dispersion are heated individually to approximately 50-90° C., and the two liquids are mixed together. The resultant mixture is maintained at approximately 50-90° C., to thereby complete reaction.

The thus-formed solid is thoroughly washed, followed by solid-liquid separation, or alternatively, the solid is subjected to solid-liquid separation, followed by thorough washing. The treated solid is dried at approximately 80-150° C. through a known method, and the dried product is calcined at preferably 200-400° C., to thereby yield a desulfurizing agent containing nickel carried on a silica-alumina carrier. The type and amounts of materials to be employed, reaction conditions, calcination conditions, etc. are chosen such that the aforementioned hydrogen adsorption capacity is attained and the amount of nickel carried on the carrier is controlled to a desired value.

The aforementioned desulfurizing agents I to IV of the present invention are employed for desulfurizing petroleum-derived hydrocarbons, preferably kerosene. These desulfurizing agents are preferably applied to, among petroleum-derived hydrocarbons, kerosene (JIS No. 1), having a sulfur content of 80 ppm by weight or less. The kerosene (JIS No. 1) can be produced through desulfurization of crude kerosene which has been yielded through distillation of crude oil at ambient pressure. The crude kerosene generally has a high sulfur content. Therefore, non-treated crude kerosene does not serve as kerosene (JIS No. 1), and the sulfur content must be reduced. In order to reduce the sulfur content, the crude kerosene is preferably desulfurized through hydro-refining, which is generally employed in the industry. Upon hydro-refining, a desulfurization catalyst comprising an alumina-based carrier and a mixture containing transition metals such as nickel, cobalt, molybdenum, and tungsten in appropriate proportions and carried on the carrier in forms of metals, oxides, sulfides, etc. is typically employed. Employed reaction conditions include reaction temperature (250-400° C.), pressure (2-10 MPa·G) hydrogen/oil mole ratio (2-10), and liquid hourly space velocity (LHSV) (1-5 $h^{-1}$).

Among the methods for desulfurizing petroleum-derived hydrocarbons by use of any of the desulfurizing agents I to IV of the present invention, the following exemplary method may be used.

Specifically, hydrogen is fed in advance to a desulfurization tower in which any of the desulfurizing agents I to IV of the present invention is charged, and the desulfurizing agent is reduced at about 150-400° C. Subsequently, petroleum-derived hydrocarbon, preferably kerosene (No. 1), is caused to pass upward or downward the desulfurization tower, whereby desulfurizing is performed at about 130-230° C., ambient pressure to about 1 MPa-G, and an LHSV of about 10 $h^{-1}$ or less. During desulfurization, a small amount of hydrogen may be present in accordance with needs. Through appropriate selection of desulfurization conditions from the above ranges, a petroleum-derived hydrocarbon having a sulfur content of 0.2 ppm by weight or less can be produced.

The method of the present invention for producing hydrogen for use in fuel cells comprises bringing the thus-desulfurized petroleum-derived hydrocarbon into contact with a steam-reforming catalyst, to thereby produce hydrogen.

No particular limitation is imposed on the steam-reforming catalyst employed in the method of the present invention, and any of conventionally known steam-reforming catalysts for hydrocarbon oil may be appropriately selected for use. Examples of such steam-reforming catalysts include a catalyst comprising an appropriate carrier and nickel, zirconium, or noble metal such as ruthenium, rhodium, or platinum carried on the carrier. The above metals may be carried on the carrier singly or in combination of two or more species. Among these steam-reforming catalysts, a catalyst containing ruthenium carried on the carrier (hereinafter referred to as ruthenium-based catalyst) is preferred, by virtue of excellent effect for suppressing carbon deposition during steam reformation.

The amount of ruthenium carried on the carrier of the ruthenium-based catalyst is preferably 0.05-20 wt.% based on the weight of the carrier. When the amount of ruthenium is less than 0.05 wt.%, satisfactory steam reformation activity may fail to be attained, whereas when the amount is in excess of 20 wt.%, catalytic activity enhancing effect commensurate with increase in amount of ruthenium is no longer obtained, resulting in a disadvantage in terms of economy. The amount of ruthenium carried on the carrier more preferably falls within a range of 0.05-15 wt.%, most preferably 0.1-2 wt.%, in consideration of factors such as catalytic activity and cost.

In addition to ruthenium, other metals may be carried in combination in accordance with needs. Examples of the metals include zirconium, cobalt, and magnesium. When ruthenium and zirconium are carried in combination, the amount of zirconium carried (as reduced to $ZrO_2$) typically falls within a range of 0.5-20 wt.% based on the weight of the carrier, preferably 0.5-15 wt.%, more preferably 1-15 wt.%. When ruthenium and cobalt are carried in combination, the amount of cobalt carried (represented by the atomic ratio of cobalt to ruthenium) typically falls within a range of 0.01-30, preferably 0.1-30, more preferably 0.1-10. When ruthenium and magnesium are carried in combination, the amount of magnesium carried (as reduced to MgO) typically falls within a range of 0.5-20 wt.% based on the weight of the carrier, preferably 0.5-15 wt.%, more preferably 1-15 wt.%.

The carrier is preferably formed of an inorganic oxide. Specific examples include alumina, silica, zirconia, magnesia, and mixtures thereof. Of these, alumina and zirconia are particularly preferred.

One preferred mode of the steam-reforming catalyst employed in the present invention is a catalyst comprising a zirconia carrier and ruthenium carried on the carrier. The zirconia may be non-modified zirconia ($ZrO_2$) or a stabilized zirconia containing a stabilizing component such as magnesia. Examples of preferred stabilized zirconia species include magnesia-stabilized zirconia, yttria-stabilized zirconia, and ceria-stabilized zirconia.

Other preferred modes of the steam-reforming catalyst employed in the present invention include a catalyst comprising alumina carrier and, carried thereon, ruthenium and zirconium; and catalysts comprising alumina carrier and, carried thereon, ruthenium, zirconium, and cobalt and/or magnesium. A particularly preferred alumina species for forming the catalysts is α-alumina, which is endowed with excellent heat resistance and mechanical strength.

Reaction conditions for steam reformation are as follows. The S/C ratio (mole ratio), wherein S denotes steam and C denotes carbon originating from petroleum-derived hydrocarbons, typically falls within a rage of 1.5-10, preferably 1.5-5, more preferably 2-4. When the S/C mole ratio is less than 1.5, the amount of formed hydrogen may decrease, whereas when the S/C ratio is in excess of 10, an excessive amount of steam is required, and significant heat loss disadvantageously decreases hydrogen production efficiency.

Furthermore, steam reformation is preferably performed while the temperature of the inlet of a steam reforming catalyst layer is preferably maintained at 630° C. or lower, more preferably 600° C. or lower. This is because when the inlet temperature is in excess of 630° C., pyrolysis of petroleum-derived hydrocarbon is promoted, and carbon deposits on the catalyst or a reactor tube wall via radicals generated during pyrolysis, sometimes causing difficulty in operation. No particular limitation is imposed on the temperature of the outlet of a catalyst layer, but the temperature is preferably 650-800° C. This is because when the outlet temperature is lower than 650° C., the amount of formed hydrogen is insufficient, whereas when reaction is effected at an outlet temperature higher than 800° C., the reactor may be lined with heat-resistant material, resulting in economic disadvantages.

In the steam reformation, the reaction pressure is preferably ambient pressure to 3 MPa, more preferably ambient pressure to 1 MPa. The LHSV typically falls within a range of 0.1-100 $h^{-1}$, preferably 0.2-50 $h^{-1}$.

In the aforementioned hydrogen production method, CO which is generated through the aforementioned steam reforming adversely affects formation of hydrogen. Thus, CO is preferably removed by transforming CO to $CO_2$ through reaction.

According to the above-described procedure, hydrogen for use in fuel cells can be produced at high efficiency.

Next, the method of the present invention for producing a nickel-based desulfurizing agent (production method I) and the methods for producing a nickel-copper-based desulfurizing agent (production methods II-a and II-b) will be described.

According to the production method I of the present invention, a desulfurizing agent comprising a silica-alumina carrier and nickel carried on the carrier can be produced through the following procedure.

Firstly, an acidic aqueous solution or dispersion having a pH of 2 or lower and containing a nickel source and an aluminum source is prepared, along with a basic aqueous solution containing a silicon source and an inorganic base. Examples of the nickel source employed for preparing the acidic aqueous solution or dispersion include nitrates, chlorides, sulfates, acetates, and carbonates. Specific examples include nickel chloride, nickel nitrate, nickel sulfate, nickel acetate, nickel carbonate, and hydrates thereof. These nickel sources may be used singly or in combination of two or more species. These nickel sources are used in such a total amount that the nickel content of the desulfurizing agent is typically at least 40 wt.%, preferably 50-70 wt.%. When the nickel content is less than 40 wt.%, the sulfur adsorption capacity decreases, thereby shortening desulfurization service life. Thus, desulfurizing agents exhibiting desired performance are difficult to produce.

Examples of the aluminum source include γ-alumina and alumina hydrates such as pseudoboehmite, boehmite alumina, bayerite, and gibbsite. Of these, pseudoboehmite, boehmite alumina, and γ-alumina are preferred. These sources of powder form and sol form may be used. These aluminum sources may be used singly or in combination of two or more species.

The pH of the above aqueous solution or dispersion containing the nickel source and aluminum source is essentially adjusted to 2 or less, preferably 1.5 or less, by use of an acid such as hydrochloric acid, sulfuric acid, and nitric acid. When the pH is higher than 2, the surface area of the desulfurizing agent and the sulfur adsorption capacity decrease, thereby shortening desulfurization service life. Thus, desulfurizing agents exhibiting desired performance are difficult to produce.

No particular limitation is imposed on the species of the silicon source incorporated into the basic solution, and any materials may be employed so long as the materials are soluble in an aqueous alkaline solution and form silica through calcinating. Examples of the silicon source include orthosilicic acid, metasilicic acid, sodium salts thereof, potassium salts thereof, and water glass. These species may be used singly or in combination of two or more species. Of these, water glass, a type of sodium silicate hydrate, is particularly preferred. Generally, the amount of the silicon source employed is preferably predetermined such that the mole ratio of silicon atoms contained in the silicon source to aluminum atoms contained in the aluminum source (Si/Al mole ratio) is 10 or less, more preferably 0.1-8. When the Si/Al mole ratio is in excess of 10, reduction of nickel oxide becomes difficult, and sulfur adsorption capacity decreases, thereby shortening the service life of the desulfurizing agent. Thus, desulfurizing agents exhibiting desired performance are difficult to produce.

Examples of preferred inorganic bases include alkali metal carbonates and alkali metal hydroxides; e.g., sodium carbonate, potassium carbonate, sodium hydroxide, and potassium hydroxide. These inorganic bases may be used singly or in combination of two or more species. Among them, the sole use of sodium carbonate or a combination of sodium carbonate and sodium hydroxide is particularly preferred in the present invention. Preferably, the amount of the inorganic base is determined in advance such that in the subsequent step a mixture of the basic aqueous solution and the aforementioned acidic aqueous solution or dispersion having a pH of 2 or less becomes substantially neutral to basic. The entire amount of the inorganic base may be employed for preparing the basic solution. Alternatively, a portion of the inorganic base may be separately added to the mixture prepared by mixing in a subsequent step the aforementioned acidic aqueous solution or dispersion and the basic solution.

According to the present invention, the thus-prepared acidic aqueous solution or dispersion having a pH of 2 or less and the basic solution are individually heated to approximately 50-90° C., followed by mixing two liquid together. The mixing is preferably performed as instantaneously as possible. After completion of mixing, the resultant mixture is stirred for about 0.5-3 hours at about 50-90° C., to thereby complete reaction.

The thus-formed solid is thoroughly washed, followed by solid-liquid separation, or alternatively, the solid is subjected to solid-liquid separation, followed by thorough washing. The treated solid is dried at approximately 80-150° C. through a known method, and the dried product is calcined at preferably 200-430° C., more preferably 250-400° C., to thereby yield a desulfurizing agent containing nickel carried on a silica-alumina carrier. When the calcination temperature falls outside the above range, the surface area of the desulfurizing agent decreases, and sulfur adsorption capacity decreases due to aggregation of nickel, thereby shortening the service life of the desulfurizing agent. Thus, nickel-based desulfurizing agents exhibiting desired performance are difficult to produce.

The nickel-based desulfurizing agent produced through the method of the present invention comprises a silica-alumina carrier and nickel carried on the carrier, wherein the carrier typically has an Si/Al mole ratio of 10 or less, preferably 0.1-8 and the nickel content is typically at least 40 wt.%, preferably 50-70 wt.%, based on the weight of the entirety of the desulfurizing agent. The desulfurizing agent can remove to a low concentration (0.2 ppm by weight or less) sulfur from a petroleum-derived hydrocarbon through adsorption and can maintain its desulfurization performance for a long period of time.

Use of the thus-produced nickel-based desulfurizing agent, and the desulfurization method and the method for producing hydrogen for use in fuel cells, by use of the desulfurizing agent, are the same as described in relation to the aforementioned desulfurizing agents I to IV of the present invention.

According to the production methods II-a and II-b of the present invention, a desulfurizing agent comprising a carrier and nickel and copper carried on the carrier can be produced through the following procedure.

Firstly, there are prepared an acidic aqueous solution or dispersion containing a nickel source, a copper source, and carrier and a basic aqueous solution containing an inorganic base. Examples of the nickel source employed for preparing the above acidic aqueous solution or dispersion include nickel chloride, nickel nitrate, nickel sulfate, nickel acetate, nickel carbonate, and hydrates thereof. These nickel sources may be used singly or in combination of two or more species.

These nickel sources are used in such amounts that the metallic nickel content of the produced desulfurizing agent preferably falls within a range of 40-80 wt.%, more preferably 50-70 wt.%. When the nickel content is less than 40 wt.%, desulfurization performance may be unsatisfactory, whereas when the nickel content is in excess of 80 wt.%, mechanical strength and desulfurization performance of the desulfurizing agent are deteriorated. Thus, desulfurizing agents exhibiting desired performance are difficult to produce.

Examples of the copper source include copper chloride, copper nitrate, copper sulfate, copper acetate, and hydrates thereof. These copper sources may be used singly or in combination of two or more species. These copper sources are used in such amounts that the metallic copper content of the produced desulfurizing agent preferably falls within a range of 5-50 wt.%, more preferably 10-35 wt.%. When the copper content is less than 5 wt.%, the sulfur adsorption rate decreases, whereas when the copper content is in excess of 50 wt.%, sulfur adsorption capacity decreases. Thus, desulfurizing agents exhibiting desired performance are difficult to produce.

The carrier is preferably a porous carrier, more preferably a porous inorganic oxide. Examples of the carrier include silica, alumina, silica-alumina, titania, zirconia, magnesia, diatomaceous earth, terra alba, clay, and zinc oxide. These oxides may be used singly or in combination of two or more species. Of these, silica-alumina is particularly preferred in the present invention. Such carriers are contained in the acidic aqueous solution or dispersion, and may also be contained in the basic aqueous solution in accordance with needs. For example, for preparing a desulfurizing agent containing a silica-alumina carrier, the aluminum source may be incorporated into the acidic aqueous solution or dispersion, and the silica source may be incorporated in the basic aqueous solution.

The pH of the above aqueous solution or dispersion containing the nickel source, copper source, and carrier is essentially adjusted to 2 or less, preferably 1.5 or less, by use of an acid such as hydrochloric acid, sulfuric acid, and nitric acid. When the pH is higher than 2, dispersibility of nickel and that of copper decrease.

Examples of preferred inorganic bases incorporated into the basic aqueous solution include alkali metal carbonates and alkali metal hydroxides; e.g., sodium carbonate, potassium carbonate, sodium hydroxide, and potassium hydroxide. These inorganic bases may be used singly or in combination of two or more species. Among them, the sole use of sodium carbonate or sodium hydroxide or a combination of sodium carbonate and sodium hydroxide is particularly preferred in the present invention. Preferably, the amount of the inorganic base is determined in advance such that in the subsequent step a mixture of the basic aqueous solution and the aforementioned acidic aqueous solution or dispersion having a pH of 2 or less becomes substantially neutral to basic.

According to the present invention, the thus-prepared acidic aqueous solution or dispersion having a pH of 2 or less and the basic aqueous solution are individually heated to approximately 50-90° C., followed by mixing two liquid together. The mixing is preferably performed as instantaneously as possible. After completion of mixing, an optional aqueous solution containing the inorganic base and heated to 50-90° C. is added to the mixture, and the resultant mixture is stirred for about 0.5-3 hours while maintained at about 50-90° C., to thereby complete reaction.

Subsequently, the thus-formed solid is thoroughly washed, followed by solid-liquid separation, or alternatively, the solid is subjected to solid-liquid separation, followed by thorough washing. The treated solid is dried at approximately 80-150° C. through a known method, and the dried product is calcined at preferably 200-400° C., more preferably 300-370° C., to thereby yield a desulfurizing agent containing nickel and copper carried on a carrier. When the calcination temperature falls outside the above range, dispersibility of nickel and copper may decrease. Thus, Ni-Cu-based desulfurizing agents exhibiting desired performance may be difficult to obtain.

According to the present invention, the amount of nickel carried on the carrier is preferably 40-80 wt.% (as reduced to metallic nickel) on the basis of the weight of the entirety of the desulfurizing agent, more preferably 50-70 wt.%. When the nickel content is less than 40 wt.%, desulfurization performance may be unsatisfactory, whereas when the nickel content is in excess of 80 wt.%, mechanical strength and desulfurization performance of the desulfurizing agent are deteriorated. Thus, desulfurizing agents exhibiting desired performance are difficult to produce.

The amount of copper carried on the carrier is preferably 5-50 wt.% (as reduced to copper) on the basis of the weight of the entirety of the desulfurizing agent, more preferably 10-35 wt.%. When the copper content is less than 5 wt.%, the sulfur adsorption rate decreases, whereas when the copper content is in excess of 50 wt.%, sulfur adsorption capacity decreases. Thus, desulfurizing agents exhibiting desired performance are difficult to produce.

According to the present invention, the total amount of nickel and copper (as metals) carried on the carrier is preferably 60-90 wt.% on the basis of the weight of the entirety of the desulfurizing agent, more preferably 60-80 wt.%. When the total amount is less than 60 wt.%, desulfurization performance may be unsatisfactory, whereas when the total amount is in excess of 90 wt.%, mechanical strength and desulfurization performance of the desulfurizing agent are deteriorated. Thus, desulfurizing agents exhibiting desired performance are difficult to produce.

According to the present invention, a nickel-copper component is carried on the carrier. However, other metals such as cobalt, iron, manganese, and chromium may also be co-present in accordance with needs.

Use of the thus-produced nickel-copper-based desulfurizing agent, and the desulfurization method and the method for producing hydrogen for use in fuel cells, by use of the desulfurizing agent, are the same as described in relation to the aforementioned desulfurizing agents I to IV of the present invention.

The present invention will next be described in more detail by way of examples, which should not be construed as limiting the invention thereto.

EXAMPLE 1

Nickel nitrate (62.3 g) was dissolved in water (500 mL), to thereby yield a solution, to which aluminum nitrate (1.3 g) was added, followed by addition of a 1 mol/L aqueous solution (20 mL) of nitric acid, whereby a liquid (A) of pH 1 was prepared.

Sodium carbonate (33.1 g) was dissolved in water (500 mL), to thereby yield a solution, to which water glass (Si: 29 wt.%) (11.7 g) was added, to thereby prepare a liquid (B).

The thus-prepared liquids (A) and (B) were individually heated to 80° C. Subsequently, the two liquids were instantaneously mixed together, and the resultant mixture was stirred for one hour while the temperature of the mixture was maintained at 80° C. The yielded product was thoroughly washed with distilled water (60 L) and filtered. The thus-separated solid was dried at 120° C. for 12 hours by means of a blow drier and calcined at 300° C. for one hour, to thereby prepare a desulfurizing agent comprising a silica-alumina carrier and nickel carried thereon (63 wt.%).

BET value (specific surface area obtained through the nitrogen adsorption method), specific surface area of pores having a diameter of 3 nm or less, and desulfurization performance of the thus-prepared desulfurizing agent are shown in Table 1.

The desulfurization performance of the desulfurizing agent was evaluated in accordance with the following method.

<Desulfurization performance>

The desulfurizing agent (15 mL) is charged into a reactor tube made of stainless steel (inner diameter: 17 mm). Subsequently, the agent is heated to 120° C. under a hydrogen stream at ambient pressure, maintained at 120° C. for one hour, heated again to 380° C., and maintained at 380° C. for one hour, whereby the desulfurizing agent is activated.

Then, kerosene (JIS No. 1, sulfur content: 65 ppm by weight) is fed into the reactor tube under ambient pressure at an LHSV of 3 $h^{-1}$ while the temperature of the reactor tube is maintained at 150° C. The sulfur content of the kerosene under treatment is monitored 50 hours after the start of feeding for evaluating desulfurization performance.

Distillation characteristics of the employed kerosene (JIS No. 1) are as follows.

Initial boiling point: 152° C.

10% Distillation temperature: 169° C.

30% Distillation temperature: 184° C.

50% Distillation temperature: 203° C.

70% Distillation temperature: 224° C.

90% Distillation temperature: 254° C.

End point: 276° C.

EXAMPLE 2

The procedure of Example 1 was repeated, except that the liquids (A) and (B) were mixed over 1 hour instead of mixing the two liquids instantaneously, to thereby prepare a desulfurizing agent comprising a silica-alumina carrier and nickel carried thereon (63 wt.%).

BET value, specific surface area of pores having a diameter of 3 nm or less, and desulfurization performance, evaluated in a manner similar to that described in Example 1, of the thus-prepared desulfurizing agent are shown in Table 1.

EXAMPLE 3

Nickel chloride (50.9 g) was dissolved in water (500 mL), to thereby yield a solution, to which a carrier (alumina) (0.6 g) was added, followed by addition of a 1 mol/L aqueous solution (20 mL) of nitric acid, whereby a liquid (A) of pH 1 was prepared.

Sodium carbonate (33.1 g) was dissolved in water (500 mL), to thereby yield a solution, to which water glass (Si: 29 wt.%) (11.7 g) was added, to thereby prepare a liquid (B).

Subsequently, through operations similar to those described in Example 1, a desulfurizing agent comprising a silica-alumina carrier and nickel carried thereon (63 wt.%) was prepared. BET value, specific surface area of pores having a diameter of 3 nm or less, and desulfurization performance, evaluated in a manner similar to that described in Example 1, of the thus-prepared desulfurizing agent are shown in Table 1.

In any of the above-described Example Nos. 1 to 3, the sulfur content of the kerosene measured 2 hours after the start of feeding was found to be less than 0.2 ppm by weight.

Comparative Example 1

Nickel nitrate (62.3 g) was dissolved in water (500 mL), to thereby yield a solution, to which a carrier (diatomaceous earth) (4 g) was added, whereby a liquid (A) was prepared.

Sodium carbonate (33.1 g) was dissolved in water (500 mL), to thereby prepare a liquid (B).

Subsequently, through operations similar to those described in Example 1, a desulfurizing agent comprising a diatomaceous earth carrier and nickel carried thereon (67 wt.%) was prepared. BET value, specific surface area of pores having a diameter of 3 nm or less, and desulfurization performance, evaluated in a manner similar to that described in Example 1, of the thus-prepared desulfurizing agent are shown in Table 1.

Comparative Example 2

Nickel nitrate (62.3 g) was dissolved in water (500 mL), to thereby yield a solution, to which silica-alumina (4.0 g) was added, whereby a liquid (A) was prepared. Sodium hydroxide (25.0 g) was dissolved in water (500 mL), to thereby prepare a liquid (B).

The thus-prepared liquids (A) and (B) were individually heated to 80° C. Subsequently, the two liquids were mixed together over one hour, and the resultant mixture was stirred for one hour while the temperature of the mixture was maintained at 80° C. Subsequently, through operations similar to those described in Example 1, a desulfurizing agent comprising a silica-alumina carrier and nickel carried thereon (63 wt.%) was prepared. BET value, specific surface area of pores having a diameter of 3 nm or less, and desulfurization performance, evaluated in a manner similar to that described in Example 1, of the thus-prepared desulfurizing agent are shown in Table 1.

TABLE 1

| | BET value ($m^2/g$) | Specific surface area of pores having a diameter of 3 nm or less ($m^2/g$) | Desulfurization performance (sulfur content of kerosene after 50-hour desulfurization) (ppm by weight) |
|---|---|---|---|
| Example 1 | 345 | 141 | less than 0.2 |
| Example 2 | 327 | 146 | less than 0.2 |
| Example 3 | 312 | 150 | less than 0.2 |
| Comparative Example 1 | 176 | 85 | 13 |
| Comparative Example 2 | 238 | 58 | 35 |

EXAMPLE 4

The desulfurizing agent (15 mL) prepared in Example 3 was charged into a reactor tube made of stainless steel (inner diameter: 17 mm). Subsequently, the agent was heated to 120° C. under a hydrogen stream at ambient pressure, maintained at 120° C. for one hour, heated again to 380° C., and maintained at 380° C. for one hour, whereby the desulfurizing agent was activated.

Then, kerosene (JIS No. 1, sulfur content: 65 ppm by weight) was fed into the reactor tube under ambient pressure at an LHSV of 2 $h^{-1}$ while the temperature of the reactor tube is maintained at 150° C., and then steam-reformed in a reforming unit which was provided on the downstream side and which included a ruthenium-based reforming catalyst (30 mL, amount of ruthenium carried: 0.5 wt.%).

Conditions of reformation are as follows: pressure: atmospheric pressure, steam/carbon (S/C) ratio (by mol) 2.5, LHSV: 1.0 $h^{-1}$, inlet temperature: 500° C., and outlet temperature: 750° C.

After 200 hours had elapsed, the percent conversion at the outlet of the reforming unit was found to be 100%. The sulfur content of the desulfurized kerosene during steam reformation was found to be less than 0.2 ppm by weight. Percent conversion is calculated on the basis of the following formula:

$$\text{Percent conversion (\%)} = 100 \times B/A$$

(wherein, A represents the total carbon amount per hour (by mol) of the fed kerosene composition; $A = CO + CO_2 + CH_4 + 2 \times C_2$ fraction $+ 3 \times C_3$ fraction $+ 4 \times C_4$ fraction $+ 5 \times C5$ fraction; B represents the total carbon amount per hour (by mol) of the outlet gas of the reforming unit; and $B = CO + CO_2 + CH_4$). Carbon amount analysis was carried out through gas chromatography.

Comparative Example 3

The procedure of Example 4 was repeated, except that the desulfurizing agent prepared in Comparative Example 1 was used, whereby desulfurization and steam reformation of kerosene were performed.

After 70 hours had elapsed, the percent conversion at the outlet of the reforming unit was below 100%, and when 90 hours had elapsed, oil droplets were detected at the outlet of the reforming unit. The sulfur content of the desulfurized kerosene after 70 hours and 90 hours had elapsed were found to be 1.5 ppm by weight and 8.0 ppm by weight, respectively.

EXAMPLE 5

Nickel nitrate (49.8 g) and copper nitrate (10.3 g) were dissolved in water (500 mL), to thereby yield a solution, to which pseudoboehmite (0.9 g) was added, followed by addition of a 1 mol/L aqueous solution (20 mL) of nitric acid, whereby a liquid (A) of pH 1 was prepared.

Sodium carbonate (33.1 g) was dissolved in water (500 mL), to thereby yield a solution, to which water glass (Si: 29 wt.%) (11.7 g) was added, to thereby prepare a liquid (B).

The thus-prepared liquids (A) and (B) were individually heated to 80° C. Subsequently, the two liquids were instantaneously mixed together, and the resultant mixture was stirred for one hour while the temperature of the mixture was maintained at 80° C. The yielded product was thoroughly washed with distilled water (60 L) and filtered. The thus-separated solid was dried at 120° C. for 12 hours by means of a blow drier and calcined at 300° C. for one hour, to thereby prepare a desulfurizing agent comprising a silica-alumina carrier (Si/Al ratio=5) and nickel and copper carried thereon (61 wt.% and 19.8 wt.%, respectively).

BET value (specific surface area obtained through the nitrogen adsorption method), specific surface area of pores having a diameter of 3 nm or less, and desulfurization performance, evaluated in a manner similar to that described in Example 1, of the thus-prepared desulfurizing agent are shown in Table 2.

EXAMPLE 6

The procedure of Example 5 was repeated, except that nickel nitrate (49.8 g) and copper nitrate (10.3 g) were replaced by nickel nitrate (56.0 g) and copper nitrate (5.2 g), and that pseudoboehmite (0.9 g) was replaced by γ-alumina (0.6 g), to thereby prepare a desulfurizing agent comprising a silica-alumina carrier (Si/Al ratio=5) and nickel and copper carried thereon (72.1 wt.% and 11.2 wt.%, respectively).

BET value, specific surface area of pores having a diameter of 3 nm or less, and desulfurization performance, evaluated in a manner similar to that described in Example 1, of the thus-prepared desulfurizing agent are shown in Table 2.

EXAMPLE 7

The procedure of Example 5 was repeated, except that the following changes were made: Nickel nitrate (49.8 g) and copper nitrate (10.3 g) were replaced by nickel nitrate (62.2 g) and copper nitrate (51.7 g); pseudoboehmite (0.9 g) was replaced by pseudoboehmite (0.8 g); sodium carbonate (33.1 g) was replaced by sodium carbonate (70 g); and water glass (11.7 g) was replaced by silica (2.5 g), to thereby prepare a desulfurizing agent comprising a silica-alumina carrier (Si/Al ratio=8) and nickel and copper carried thereon (30.2 wt.% and 50.8 wt.%, respectively).

BET value, specific surface area of pores having a diameter of 3 nm or less, and desulfurization performance, evaluated in a manner similar to that described in Example 1, of the thus-prepared desulfurizing agent are shown in Table 2.

In the above-described Example Nos. 5 to 7, the sulfur content of the desulfurized kerosene measured 50 hours after the start of feeding was found to be less than 0.2 ppm by weight.

Comparative Example 4

Copper nitrate (58 g), nickel nitrate (69.8 g), zinc nitrate (116.6 g), and aluminum nitrate (60 g) was dissolved in water (1,000 mL), to thereby prepare a liquid (A).

Sodium carbonate (105 g) was dissolved in water (2,000 mL), to thereby prepare a liquid (B).

The liquid (B) was gradually added to the liquid (A) with stirring until the pH of the mixture reached 7, and the mixture was stirred for a further one hour. The precipitated cake was washed by use of ammonium bicarbonate, and the washed solid was dried at 110° C. for one day by means of a drier, followed by calcinating at 400° C. for 1 hour, to thereby prepare a desulfurizing agent containing nickel and copper in amounts of 21 wt.% and 22 wt.%, respectively.

BET value (specific surface area obtained through the nitrogen adsorption method), specific surface area of pores having a diameter of 3 nm or less, and desulfurization performance, evaluated in a manner similar to that described in Example 1, of the thus-prepared desulfurizing agent are shown in Table 2.

Comparative Example 5

Nickel nitrate (50.0 g) and copper nitrate (9.5 g) were dissolved in water (500 mL), to thereby yield a solution, to which silica-alumina (4.0 g) was added, to thereby prepare a liquid (A). Sodium hydroxide (25.0 g) was dissolved in water (500 mL), to thereby prepare a liquid (B). The thus-prepared liquids (A) and (B) were individually heated to 80° C. Subsequently, the two liquids were mixed together over one hour, and the resultant mixture was stirred for one hour while the temperature of the mixture was maintained at 80° C. The yielded product was thoroughly washed with distilled water (60 L) and filtered. The thus-separated solid was dried at 120° C. for 12 hours by means of a blow drier and calcined at 300° C. for one hour, to thereby prepare a desulfurizing agent comprising a silica-alumina carrier (Si/Al ratio=8) and nickel and copper carried thereon (55.9 wt.% and 18.2 wt.%, respectively).

BET value, specific surface area of pores having a diameter of 3 nm or less, and desulfurization performance, evaluated in a manner similar to that described in Example 1, of the thus-prepared desulfurizing agent are shown in Table 2.

TABLE 2

| | BET value ($m^2/g$) | Specific surface area of pores having a diameter of 3 nm or less ($m^2/g$) | Desulfurization performance (sulfur content of kerosene after 50-hour desulfurization) (ppm by weight) |
| --- | --- | --- | --- |
| Example 5 | 326 | 172 | less than 0.2 |
| Example 6 | 348 | 169 | less than 0.2 |
| Example 7 | 247 | 124 | less than 0.2 |
| Comparative Example 4 | 91 | 17 | 60 |
| Comparative Example 5 | 149 | 73 | 30 |

EXAMPLE 8

The desulfurizing agent (15 mL) prepared in Example 5 was charged into a reactor tube made of stainless steel (inner diameter: 17 mm). Subsequently, the agent was heated to 120° C. under a hydrogen stream at ambient pressure, maintained at 120° C. for one hour, heated again to 380° C., and maintained at 380° C. for one hour, whereby the desulfurizing agent was activated.

Then, kerosene (JIS No. 1, sulfur content: 65 ppm by weight) was fed into the reactor tube under ambient pressure at an LHSV of 2 $h^{-1}$ while the temperature of the reactor tube is maintained at 150° C., and then steam-reformed in a reforming unit which was provided on the downstream side and which included a ruthenium-based reforming catalyst (20 mL, amount of ruthenium carried: 0.5 wt.%).

Conditions of reformation are as follows: pressure: atmospheric pressure, steam/carbon (S/C) ratio (by mol) 2.5, LHSV: 1.5 $h^{-1}$, inlet temperature: 500° C., and outlet temperature: 750° C.

After 230 hours had elapsed, the percent conversion at the outlet of the reforming unit was found to be 100%. The sulfur content of the desulfurized kerosene during steam reformation was found to be less than 0.2 ppm by weight.

Comparative Example 6

The procedure of Example 8 was repeated, except that the desulfurizing agent prepared in Comparative Example 4 was used, whereby desulfurization and steam reformation of kerosene were performed.

After 80 hours had elapsed, the percent conversion at the outlet of the reforming unit was below 100%, and when 120 hours had elapsed, oil droplets were detected at the outlet of the reforming unit. The sulfur content of the desulfurized kerosene after 70 hours and 90 hours had elapsed were found to be 4 ppm by weight and 13 ppm by weight, respectively.

EXAMPLE 9

Nickel nitrate (87.1 g), copper nitrate (20.7 g), and zinc nitrate (6.4 g) were dissolved in water (500 mL), to thereby yield a solution, to which pseudoboehmite (1.8 g) was added, followed by addition of a 1 mol/L aqueous solution (20 mL) of nitric acid, whereby a liquid (A) of pH 1 was prepared.

Sodium carbonate (70.0 g) was dissolved in water (500 mL), to thereby yield a solution, to which water glass (Si: 29 wt.%) (23.4 g) was added, to thereby prepare a liquid (B).

The thus-prepared liquids (A) and (B) were individually heated to 80° C. Subsequently, the two liquids were instantaneously mixed together, and the resultant mixture was stirred for one hour while the temperature of the mixture was maintained at 80° C. The yielded product was thoroughly washed with distilled water (60 L) and filtered. The thus-separated solid was dried at 120° C. for 12 hours by means of a blow drier and calcined at 300° C. for one hour, to thereby prepare a desulfurizing agent comprising a silica-alumina carrier (Si/Al mole ratio: 5) and Ni, Cu, and Zn carried thereon (51.0 wt.%, 19.8 wt.%, and 4.9 wt.%, respectively, on the basis of the weight of the entirety of the desulfurizing agent).

Desulfurization performance of the thus-prepared desulfurizing agent are shown in Table 3.

The desulfurization performance of the desulfurizing agent was evaluated in accordance with the following method.

<Desulfurization performance>

A desulfurizing agent (15 mL) is charged into a reactor tube made of stainless steel (inner diameter: 17 mm). Subsequently, the agent is heated to 120° C. under a hydrogen stream at ambient pressure, maintained at 120° C. for one hour, heated again to 380° C., and maintained at 380° C. for one hour, whereby the desulfurizing agent is activated.

Then, kerosene (JIS No. 1, sulfur content: 65 ppm by weight) is fed into the reactor tube under ambient pressure at an LHSV of 10 $h^{-1}$ while the temperature of the reactor tube is maintained at 150° C. The sulfur content of the desulfurized kerosene is monitored 5 hours after the start of feeding for evaluating desulfurization performance.

Distillation characteristics of the employed kerosene (JIS No. 1) are same as those described in Example 1.

EXAMPLE 10

Nickel nitrate (46.7 g), copper nitrate (6.5 g), and manganese nitrate (3.6 g) were dissolved in water (500 mL), to thereby yield a solution, to which pseudoboehmite (0.9 g) was added, followed by addition of a 1 mol/L aqueous solution (10 mL) of nitric acid, whereby a liquid (A) of pH 1 was prepared.

Sodium carbonate (35.0 g) was dissolved in water (500 mL), to thereby yield a solution, to which water glass (Si: 29 wt.%) (11.7 g) was added, to thereby prepare a liquid (B).

Subsequently, operations similar to those described in Example 9 were performed, to thereby prepare a desulfurizing agent comprising a silica-alumina carrier (Si/Al mole ratio: 5) and Ni, Cu, and manganese carried thereon (60.2 wt.%, 10.2 wt.%, and 5.3 wt.%, respectively, on the basis of the weight of the entirety of the desulfurizing agent).

Desulfurization performance, evaluated in a manner similar to that described in Example 9, of the thus-prepared desulfurizing agent are shown in Table 3.

EXAMPLE 11

Nickel nitrate (49.8 g) and copper nitrate (10.3 g) were dissolved in water (500 mL), to thereby yield a solution, to which pseudoboehmite (0.9 g) was added, followed by addition of a 1 mol/L aqueous solution (20 mL) of nitric acid, whereby a liquid (A) of pH 1 was prepared.

Sodium carbonate (33.1 g) was dissolved in water (500 mL), to thereby yield a solution, to which water glass (Si: 29 wt.%) (11.7 g) was added, to thereby prepare a liquid (B).

The thus-prepared liquids (A) and (B) were individually heated to 80° C. Subsequently, the two liquids were instantaneously mixed together, and the resultant mixture was stirred for one hour while the temperature of the mixture was maintained at 80° C. The yielded product was thoroughly washed with distilled water (60 L) and filtered. The thus-separated solid was dried at 120° C. for 12 hours by means of a blow drier. Potassium carbonate (5 g) was added to the thus-dried solid, and the resultant mixture was calcined at 300° C. for one hour, to thereby prepare a desulfurizing agent comprising a silica-alumina carrier (Si/Al mole ratio: 5) and Ni, Cu, and K carried thereon (57.1 wt.%, 18.5 wt.%, and 3.2 wt.%, respectively, on the basis of the weight of the entirety of the desulfurizing agent).

Desulfurization performance, evaluated in a manner similar to that described in Example 9, of the thus-prepared desulfurizing agent are shown in Table 3.

EXAMPLE 12

The procedure of Example 11 was repeated, except that basic magnesium carbonate (MgO 45 wt.%) was added instead of potassium carbonate (5 g) before calcinating at 300° C. for one hour, to thereby prepare a desulfurizing agent comprising a silica-alumina carrier (Si/Al mole ratio:

5) and Ni, Cu, and Mg carried thereon (57.1 wt.%, 18.5 wt.%, and 3.9 wt.%, respectively, on the basis of the weight of the entirety of the desulfurizing agent).

Desulfurization performance, evaluated in a manner similar to that described in Example 9, of the thus-prepared desulfurizing agent are shown in Table 3.

EXAMPLE 13

In a manner similar to that described in Example 13, liquids (A) and (B) were prepared. The two liquids were individually heated to 80° C. Subsequently, the two liquids were instantaneously mixed together, and the resultant mixture was stirred for one hour while the temperature of the mixture was maintained at 80° C. The yielded product was thoroughly washed with distilled water (60 L) and filtered. The thus-separated solid was dried at 120° C. for 12 hours by means of a blow drier. The dried solid was impregnated with a solution of chloroplatinic acid (1 g) in water (10 mL), and the resultant solid was dried at 120° C. by means of a blow drier, followed by calcinating at 300° C. for one hour, to thereby prepare a desulfurizing agent comprising a silica-alumina carrier (Si/Al mole ratio: 5) and Ni, Cu, and Pt carried thereon (57.1 wt.%, 18.5 wt.%, and 2.0 wt.%, respectively, on the basis of the weight of the entirety of the desulfurizing agent).

Desulfurization performance, evaluated in a manner similar to that described in Example 9, of the thus-prepared desulfurizing agent are shown in Table 3.

EXAMPLE 14

Nickel nitrate (44.8 g), copper nitrate (10.3 g), and lanthanum nitrate (8.5 g) were dissolved in water (500 mL), to thereby yield a solution, to which pseudoboehmite (0.9 g) was added, followed by addition of a 1 mol/L aqueous solution (20 mL) of nitric acid, whereby a liquid (A) of pH 1 was prepared.

In a manner similar to that described in Example 11, a liquid (B) was prepared and subsequent operations was performed, to thereby prepare a desulfurizing agent comprising a silica-alumina carrier (Si/Al mole ratio: 5) and Ni, Cu, and La carried thereon (51.8 wt.%, 18.5 wt.%, and 7.1 wt.%, respectively, on the basis of the weight of the entirety of the desulfurizing agent).

Desulfurization performance, evaluated in a manner similar to that described in Example 9, of the thus-prepared desulfurizing agent are shown in Table 3.

Comparative Example 7

Copper nitrate (58 g), nickel nitrate (69.8 g), zinc nitrate (116.6 g), and aluminum nitrate (60 g) was dissolved in water (1 L), to thereby prepare a liquid (A).

Sodium carbonate (105 g) was dissolved in water (2 L), to thereby prepare a liquid (B).

The liquid (B) was gradually added to the liquid (A) with stirring until the pH of the mixture reached 7, and the mixture was stirred for a further one hour. The precipitated cake was washed by use of an aqueous ammonium hydrogencarbonate solution, and the washed solid was dried at 1100C for one day by means of a drier, followed by calcinating at 400° C. for one hour, to thereby prepare a desulfurizing agent comprising a carrier containing ZnO and $Al_2O_3$ in amounts of 46 wt.% and 11 wt.%, respectively, and Ni and Cu carried thereon in amounts of 21 wt.% and 22 wt.%, respectively, on the basis of the weight of the entirety of the desulfurizing agent.

Desulfurization performance, evaluated in a manner similar to that described in Example 9, of the thus-prepared desulfurizing agent are shown in Table 3.

TABLE 3

|  | Desulfurization performance Sulfur content of kerosene after 5-hour desulfurization (ppm) |
| --- | --- |
| Example 9 | 4 |
| Example 10 | 7 |
| Example 11 | 5 |
| Example 12 | 4 |
| Example 13 | 6 |
| Example 14 | 7 |
| Comparative Example 7 | 50 |

EXAMPLE 15

The desulfurizing agent (15 mL) prepared in Example 9 was charged into a reactor tube made of stainless steel (inner diameter: 17 mm). Subsequently, the agent was heated to 120° C. under a hydrogen stream at ambient pressure, maintained at 120° C. for one hour, heated again to 380° C., and maintained at 380° C. for one hour, whereby the desulfurizing agent was activated.

Then, kerosene (JIS No. 1, sulfur content: 65 ppm by weight) was fed into the reactor tube under ambient pressure at an LHSV of 2 $h^{-1}$ while the temperature of the reactor tube is maintained at 150° C., and then steam-reformed in a reforming unit which was provided on the downstream side and which included a ruthenium-based reforming catalyst (20 mL, amount of ruthenium carried: 0.5 wt.%).

Conditions of reformation are as follows: pressure: atmospheric pressure, steam/carbon (S/C) ratio (by mol) 2.5, LHSV: 1.5 $h^{-1}$, inlet temperature: 500° C., and outlet temperature: 750° C.

After 150 hours had elapsed, the percent conversion at the outlet of the reforming unit was found to be 100%.

Percent conversion was calculated in a manner similar to that described in Example 4.

Comparative Example 8

The procedure of Example 15 was repeated, except that the desulfurizing agent prepared in Comparative Example 7 was used, whereby desulfurization and steam reformation of kerosene were performed.

After 80 hours had elapsed, the percent conversion at the outlet of the reforming unit was below 100%, and when 120 hours had elapsed, oil droplets were detected at the outlet of the reforming unit.

EXAMPLE 16

Nickel chloride (50.9 g) was dissolved in water (500 mL), to thereby yield a solution, to which alumina (pseudoboehmite) (0.6 g) serving as a carrier was added, followed by addition of a 1 mol/L aqueous solution (20 mL) of nitric acid, whereby a liquid (A) of pH 1 was prepared.

Sodium carbonate (33.1 g) was dissolved in water (500 mL), to thereby yield a solution, to which water glass (SiO$_2$: 29 wt.%) (11.7 g) was added, to thereby prepare a liquid (B).

The thus-prepared liquids (A) and (B) were individually heated to 80° C. Subsequently, the two liquids were instantaneously mixed together, and the resultant mixture was stirred for one hour while the temperature of the mixture was maintained at 80° C. The yielded product was thoroughly washed with distilled water (60 L) and filtered. The thus-separated solid was dried at 120° C. for 12 hours by means of a blow drier and calcined at 300° C. for one hour, to thereby prepare a desulfurizing agent comprising a silica-alumina carrier and nickel carried thereon (63 wt.%).

The hydrogen adsorption capacity of the above-prepared desulfurizing agent was found to be 0.75 mmol/g, and the sulfur content of the kerosene after 50-hour desulfurization, as measured in a manner similar to that described in Example 1 was found to be 0.2 ppm by weight.

EXAMPLE 17

Nickel nitrate (62.3 g) was dissolved in water (500 mL) to thereby yield a solution, to which a carrier (silica powder) (4 g) was added, followed by addition of a 1 mol/L aqueous solution (20 mL) of nitric acid, whereby a liquid (A) of pH 1 was prepared.

Sodium carbonate (33.1 g) was dissolved in water (500 mL), to thereby prepare a liquid (B).

Subsequently, through operations similar to those described in Example 16, a desulfurizing agent comprising a silica carrier and nickel carried thereon (60 wt.%) was prepared.

The hydrogen adsorption capacity of the above-prepared desulfurizing agent was found to be 0.50 mmol/g, and the sulfur content of the kerosene after 50-hour desulfurization, as measured in a manner similar to that described in Example 1 was found to be 0.2 ppm by weight.

Comparative Example 9

Nickel nitrate (62.3 g) was dissolved in water (500 mL), to thereby yield a solution, to which a carrier (diatomaceous earth) (4 g) was added, whereby a liquid (A) was prepared.

Sodium carbonate (33.1 g) was dissolved in water (500 mL), to thereby prepare a liquid (B).

Subsequently, through operations similar to those described in Example 16, a desulfurizing agent comprising a diatomaceous earth carrier and nickel carried thereon (67 wt.%) was prepared.

The hydrogen adsorption capacity of the above-prepared desulfurizing agent was found to be 0.32 mmol/g, and the sulfur content of the kerosene after 50-hour desulfurization, as measured in a manner similar to that described in Example 1 was found to be 15.2 ppm by weight.

EXAMPLE 18

The desulfurizing agent (15 mL) prepared in Example 16 was charged into a reactor tube made of stainless steel (inner diameter: 17 mm). Subsequently, the agent was heated to 120° C. under a hydrogen stream at ambient pressure, maintained at 120° C. for one hour, heated again to 380° C., and maintained at 380° C. for one hour, whereby the desulfurizing agent was activated.

Then, kerosene (JIS No. 1, sulfur content: 65 ppm by weight) was fed into the reactor tube under ambient pressure at an LHSV of 3 h$^{-1}$ while the temperature of the reactor tube is maintained at 150° C., and then steam-reformed in a reforming unit which was provided on the downstream side and which included a ruthenium-based reforming catalyst (30 mL, amount of ruthenium carried: 0.5 wt.%).

Conditions of reformation are as follows: pressure: atmospheric pressure, steam/carbon (S/C) ratio (by mol) 2.5, LHSV: 1.5 h$^{-1}$, inlet temperature: 500° C., and outlet temperature: 750° C.

After 150 hours had elapsed, the percent conversion at the outlet of the reforming unit was found to be 100%.

Percent conversion was calculated in a manner similar to that described in Example 4.

Comparative Example 10

The procedure of Example 18 was repeated, except that the desulfurizing agent prepared in Comparative Example 9 was used, whereby desulfurization and steam reformation of kerosene were performed.

After 24 hours had elapsed, the percent conversion at the outlet of the reforming unit was below 100%, and when 30 hours had elapsed, oil droplets were detected at the outlet of the reforming unit.

EXAMPLE 19

Nickel chloride (50.9 g) was dissolved in water (500 mL), to thereby yield a solution, to which pseudoboehmite (0.6 g) was added, followed by addition of a 1 mol/L aqueous solution (20 mL) of nitric acid, whereby a liquid (A) of pH 1 was prepared.

Sodium carbonate (22.7 g) was dissolved in water (500 mL), to thereby yield a solution, to which water glass (Si: 29 wt.%) (11.7 g) was added, to thereby prepare a liquid (B).

The thus-prepared liquids (A) and (B) were individually heated to 80° C. Subsequently, the two liquids were instantaneously mixed together, and a solution of sodium hydroxide (7.8 g) in water (50 mL) which had been heated to 80° C. was added thereto. The resultant mixture was stirred for one hour while the temperature of the mixture was maintained at 80° C.

The resultant product was thoroughly washed with distilled water (60 L) and filtered. The thus-separated solid was dried at 120° C. for 12 hours by means of a blow drier and calcined at 300° C. for one hour, to thereby produce a desulfurizing agent comprising a silica-alumina carrier (Si/Al mole ratio: about 5) and nickel carried thereon (63 wt.% on the basis of the weight of the entirety of the desulfurizing agent).

EXAMPLE 20

The procedure of Example 19 was repeated, except that the liquid (B) was prepared by use of sodium carbonate (33.1 g), and that no aqueous sodium hydroxide solution was added, to thereby produce a desulfurizing agent comprising a silica-alumina carrier (Si/Al mole ratio: about 5) and nickel carried thereon (63 wt.% on the basis of the weight of the entirety of the desulfurizing agent).

EXAMPLE 21

The procedure of Example 19 was repeated, except that the liquid (A) was prepared by use of boehmite alumina (0.4 g) instead of pseudoboehmite (0.6 g), and that the liquid (B) was prepared by use of water glass (Si: 29 wt.%) (12.5 g), to thereby produce a desulfurizing agent comprising a silica-alumina carrier (Si/Al mole ratio: about 8) and nickel carried thereon (63 wt.% on the basis of the weight of the entirety of the desulfurizing agent).

EXAMPLE 22

The procedure of Example 19 was repeated, except that calcination was performed at 250° C. for 1 hour, to thereby produce a desulfurizing agent comprising a silica-alumina carrier (Si/Al mole ratio: about 5) and nickel carried thereon (63 wt.% on the basis of the weight of the entirety of the desulfurizing agent).

EXAMPLE 23

The procedure of Example 19 was repeated, except that, the liquid (A) was prepared by use of alumina sol (alumina: 20 wt.%) (2.9 g) instead of pseudoboehmite (0.6 g), to thereby produce a desulfurizing agent comprising a silica-alumina carrier (Si/Al mole ratio: about 5) and nickel carried thereon (63 wt.% on the basis of the weight of the entirety of the desulfurizing agent).

Comparative Example 11

Nickel chloride (50.9 g) was dissolved in water (500 mL), to thereby yield a solution, to which alumina sol (alumina: 20 wt.%) (0.8 g) was added, whereby a liquid (A) was prepared. The pH of the liquid (A) was 5.

Sodium hydrogencarbonate (18 g) was dissolved in water (500 mL), to thereby yield a solution, to which water glass (Si: 29 wt.%) (13.2 g) was added, to thereby prepare a liquid (B).

The thus-prepared liquids (A) and (B) were individually heated to 80° C. Subsequently, the two liquids were instantaneously mixed together, and the mixture was stirred for one hour while the temperature of the mixture was maintained at 80° C.

The yielded product was thoroughly washed with distilled water (60 L) and filtered. The thus-separated solid was dried at 120° C. for 12 hours by means of a blow drier and calcined at 300° C. for one hour, to thereby produce a desulfurizing agent comprising a silica-alumina carrier (Si/Al mole ratio: about 20) and nickel carried thereon (63 wt.% on the basis of the weight of the entirety of the desulfurizing agent).

Comparative Example 12

Nickel chloride (50.9 g) was dissolved in water (500 mL), whereby a liquid (A) was prepared. The pH of the liquid (A) was found to be 5.

Sodium hydroxide (17.1 g) was dissolved in water (500 mL), to thereby yield a solution, to which water glass (Si: 29 wt.%) (13.8 g) was added, to thereby prepare a liquid (B).

Subsequently, through operations similar to those described in Comparative Example 11, a desulfurizing agent comprising a silica carrier and nickel carried thereon (63 wt.% on the basis of the weight of the entirety of the desulfurizing agent) was prepared.

Comparative Example 13

A liquid (A) was prepared in a manner similar to that described in Comparative Example 11. Sodium hydroxide (17.1 g) was dissolved in water (500 mL), to thereby yield a solution, to which water glass (Si: 29 wt.%) (13.8 g) was added, to thereby prepare a liquid (B).

The thus-prepared liquids (A) and (B) were individually heated to 80° C. Subsequently, the two liquids were instantaneously mixed together, and the mixture was stirred for one hour while the temperature of the mixture was maintained at 80° C.

The resultant product was thoroughly washed with distilled water (60 L) and filtered. The thus-separated solid was dried at 120° C. for 12 hours by means of a blow drier and calcined at 450° C. for one hour, to thereby produce a desulfurizing agent comprising a silica-alumina carrier (Si/Al mole ratio: about 20) and nickel carried thereon (63 wt.% on the basis of the weight of the entirety of the desulfurizing agent).

Comparative Example 14

Nickel nitrate (62.3 g) was dissolved in water (500 mL), to thereby yield a solution, to which a carrier (diatomaceous earth) (4 g) was added, whereby a liquid (A) was prepared.

Sodium carbonate (33.1 g) was dissolved in water (500 mL), to thereby prepare a liquid (B).

The thus-prepared liquids (A) and (B) were individually heated to 80° C. Subsequently, the two liquids were instantaneously mixed together, and the mixture was stirred for one hour while the temperature of the mixture was maintained at 80° C.

The resultant product was thoroughly washed with distilled water (60 L) and filtered. The thus-separated solid was dried at 120° C. for 12 hours by means of a blow drier and calcined at 300° C. for one hour, to thereby produce a desulfurizing agent comprising a diatomaceous earth carrier and nickel carried thereon (67 wt.% on the basis of the weight of the entirety of the desulfurizing agent).

TEST EXAMPLE

Each of the desulfurizing agents prepared in Example Nos. 19 to 23 and Comparative Example Nos. 11 to 14 was charged into a reactor tube made of stainless steel (inner diameter: 17 mm) in an amount of 15 mL. Subsequently, the agent was heated to 120° C. under a hydrogen stream at ambient pressure, maintained at 120° C. for one hour, heated again to 380° C., and maintained at 380° C. for one hour, whereby the desulfurizing agent was activated.

Then, kerosene (JIS No. 1, sulfur content: 65 ppm by weight) was fed into the reactor tube under ambient pressure at an LHSV of 3 $h^{-1}$ while the temperature of the reactor tube is maintained at 150° C.

In each case, the sulfur content of the desulfurized kerosene was monitored 50-hour after the start of feeding for evaluating desulfurization performance.

The results, together with starting materials of the desulfurizing agents, and other conditions are shown in Table 4. Distillation characteristics of the employed kerosene (JIS No. 1) are same as those described in Example 1.

TABLE 4-1

| | | Starting Materials | | | |
|---|---|---|---|---|---|
| | | Acid dispersions | | Basic solutions | |
| | | Ni sources | Al sources (other sources) | pH | Si sources | Inorganic bases |

| | | Ni sources | Al sources (other sources) | pH | Si sources | Inorganic bases |
|---|---|---|---|---|---|---|
| Ex. | 19 | $NiCl_2$ | Pseudoboehmite | 1 | Water glass | $Na_2CO_3$ + NaOH |
| | 20 | $NiCl_2$ | Pseudoboehmite | 1 | Water glass | $Na_2CO_3$ |
| | 21 | $NiCl_2$ | Boehmite alumina | 1 | Water glass | $Na_2CO_3$ + NaOH |
| | 22 | $NiCl_2$ | Pseudoboehmite | 1 | Water glass | $Na_2CO_3$ + NaOH |
| | 23 | $NaCl_2$ | Alumina sol | 1 | Water glass | $Na_2CO_3$ + NaOH |
| Comp. Ex. | 11 | $NiCl_2$ | Alumina sol | 5 | Water glass | $NaHCO_3$ |
| | 12 | $NiCl_2$ | — | 5 | Water glass | NaOH |
| | 13 | $NiCl_2$ | Alumina sol | 5 | Water glass | NaOH |
| | 14 | $Ni(NO_3)_2$ | Diatomaceous earth | — | — | $Na_2CO_3$ |

TABLE 4-2

| | | Desulfurizing agents | | | Evaluation |
|---|---|---|---|---|---|
| | | Calcination temp. (° C.) | Si/Al (mole ratio) | Amount of Ni carried (wt. %) | Sulfur content (ppm by weight) |
| Ex. | 19 | 300 | 5 | 63 | less than 0.2 |
| | 20 | 300 | 5 | 63 | less than 0.2 |
| | 21 | 300 | 8 | 63 | less than 0.2 |
| | 22 | 250 | 5 | 63 | less than 0.2 |
| | 23 | 300 | 5 | 63 | less than 0.2 |
| Comp. Ex. | 11 | 300 | 20 | 63 | 18.0 |
| | 12 | 300 | — | 63 | 17.7 |
| | 13 | 450 | 20 | 63 | 19.4 |
| | 14 | 300 | — | 67 | 15.2 |

As shown in Table 4, all the desulfurizing agents produced in Examples exhibit high desulfurization performance as compared with those of the desulfurizing agents produced in Comparative Examples.

EXAMPLE 24

Nickel nitrate (49.8 g) and copper nitrate (10.3 g) were dissolved in water (500 mL), to thereby yield a solution, to which pseudoboehmite (serving as a carrier) (0.9 g) was added, followed by addition of a 1 mol/L aqueous solution (20 mL) of nitric acid, whereby a liquid (A) of pH 1 was prepared. Sodium carbonate (33.1 g) was dissolved in water (500 mL), to thereby yield a solution, to which water glass ($SiO_2$:29 wt.%) (11.7 g) was added, to thereby prepare a liquid (B).

The thus-prepared liquids (A) and (B) were individually heated to 80° C. Subsequently, the two liquids were instantaneously mixed together, and the resultant mixture was stirred for one hour while the temperature of the mixture was maintained at 80° C. The yielded product was thoroughly washed with distilled water (60 L) and filtered. The thus-separated solid was dried at 120° C. for 12 hours by means of a blow drier and calcined at 300° C. for one hour, to thereby prepare a desulfurizing agent comprising a silica-alumina carrier (Si/Al ratio=5) and nickel and copper carried thereon (61 wt.% and 19.8 wt.%, respectively).

The desulfurization test was performed by use of the above-prepared desulfurizing agent and in a manner similar to that described in Example 9. The sulfur content of the kerosene after 5-hour desulfurization was found to be 2 ppm by weight.

EXAMPLE 25

The procedure of Example 24 was repeated, except that nickel nitrate (49.8 g) and copper nitrate (10.3 g) were replaced by nickel nitrate (56.0 g) and copper nitrate (5.2 g), and that pseudoboehmite (0.9 g) was replaced by γ-alumina (0.6 g), to thereby prepare a desulfurizing agent comprising a silica-alumina carrier (Si/Al ratio=5) and nickel and copper carried thereon (72.1 wt.% and 11.2 wt.%, respectively).

The desulfurization test was performed by use of the above-prepared desulfurizing agent and in a manner similar to that described in Example 9. The sulfur content of the kerosene after 5-hour desulfurization was found to be 5 ppm by weight.

EXAMPLE 26

The procedure of Example 24 was repeated, except that the following changes were made: Nickel nitrate (49.8 g) and copper nitrate (10.3 g) were replaced by nickel nitrate (62.2 g) and copper nitrate (51.7 g); pseudoboehmite (0.9 g) was replaced by pseudoboehmite (0.8 g); sodium carbonate (33.1 g) was replaced by sodium carbonate (70 g); and water glass (11.7 g) was replaced by silica (2.5 g), to thereby prepare a desulfurizing agent comprising a silica-alumina carrier (Si/Al ratio=8) and nickel and copper carried thereon (30.2 wt.% and 50.8 wt.%, respectively).

The desulfurization test was performed by use of the above-prepared desulfurizing agent and in a manner similar to that described in Example 9. The sulfur content of the kerosene after 5-hour desulfurization was found to be 8 ppm by weight.

EXAMPLE 27

The procedure of Example 26 was repeated, except that pseudoboehmite (0.9 g) was replaced by silica (4.0 g) and water glass was not employed, to thereby prepare a desulfurizing agent comprising a silica carrier and nickel and copper carried thereon (30.2 wt.% and 50.8 wt.%, respectively).

The desulfurization test was performed by use of the above-prepared desulfurizing agent and in a manner similar to that described in Example 9. The sulfur content of the kerosene after 5-hour desulfurization was found to be 8 ppm by weight.

Comparative Example 15

Copper nitrate (58 g), nickel nitrate (69.8 g), zinc nitrate (116.6 g), and aluminum nitrate (60 g) was dissolved in water (1,000 mL), to thereby prepare a liquid (A). Sodium carbonate (105 g) was dissolved in water (2,000 mL), to thereby prepare a liquid (B).

The liquid (B) was gradually added to the liquid (A) with stirring until the pH of the mixture reached 7, and the mixture was stirred for a further one hour. The precipitated cake was washed by use of ammonium bicarbonate, and the washed solid was dried at 110° C. for one day by means of a drier, followed by calcinating at 400° C. for 1 hour, to thereby prepare a desulfurizing agent containing nickel and copper in amounts of 21 wt.% and 22 wt.%, respectively.

The desulfurization test was performed by use of the above-prepared desulfurizing agent and in a manner similar to that described in Example 9. The sulfur content of the kerosene after 5-hour desulfurization was found to be 50 ppm by weight.

EXAMPLE 28

The desulfurizing agent (15 mL) prepared in Example 24 was charged into a reactor tube made of stainless steel (inner diameter: 17 mm). Subsequently, the agent was heated to 120° C. under a hydrogen stream at ambient pressure, maintained at 120° C. for one hour, heated again to 380° C., and maintained at 380° C. for one hour, whereby the desulfurizing agent was activated.

Then, kerosene (JIS No. 1, sulfur content: 65 ppm by weight) was fed into the reactor tube under ambient pressure at an LHSV of 2 $h^{-1}$ while the temperature of the reactor tube is maintained at 150° C., and then steam-reformed in a reforming unit which was provided on the downstream side and which included a ruthenium-based reforming catalyst (20 mL, amount of ruthenium carried: 0.5 wt.%).

Conditions of reformation are as follows: pressure: atmospheric pressure, steam/carbon (S/C) ratio (by mol) 2.5, LHSV: 1.5 $h^{-1}$, inlet temperature: 500° C., and outlet temperature: 750° C.

After 150 hours had elapsed, the percent conversion at the outlet of the reforming unit was found to be 100%. The sulfur content of the desulfurized kerosene during the desulfurization was found to be less than 0.2 ppm by weight. Percent conversion was calculated in a manner similar to that described in Example 4.

Comparative Example 16

The procedure of Example 28 was repeated, except that the desulfurizing agent prepared in Comparative Example 15 was employed, whereby desulfurization and steam reformation of kerosene were performed.

After 80 hours had elapsed, the percent conversion at the outlet of the reforming unit was below 100%, and when 120 hours had elapsed, oil droplets were detected at the outlet of the reforming unit. The sulfur content of the desulfurized kerosene after 80 hours and 120 hours had elapsed were found to be 10 ppm by weight and 18 ppm by weight, respectively.

INDUSTRIAL APPLICABILITY

The desulfurizing agents of the present invention are capable of adsorbing and removing with good efficiency sulfur contained in petroleum-derived hydrocarbons to a content of 0.2 wt. ppm or less and have a long service life. The steam reforming of petroleum-derived hydrocarbons having been desulfurized by use of any one of the above desulfurizing agents allows the production of hydrogen for use in a fuel cell with good efficiency.

According to the present invention, nickel-based desulfurizing agents and nickel-copper-based desulfurizing agents which exhibit excellent desulfurization performance can be produced effectively.

The invention claimed is:

1. A desulfurizing agent for a petroleum-derived hydrocarbon comprising a silica-alumina carrier, and at least nickel carried on the carrier, wherein the silica-alumina carrier has a Si/Al mole ratio of 10 or less, wherein the desulfurizing agent has a specific surface area of pores having a diameter of 3 nm or less of 100 $m^2/g$ or more.

2. A desulfurizing agent for a petroleum-derived hydrocarbon comprising a silica-alumina carrier, and at least nickel carried on the carrier, wherein the silica-alumina carrier has a Si/Al mole ratio of 10 or less, further comprising copper carried on the carrier.

3. A desulfurizing agent for a petroleum-derived hydrocarbon as described in claim 1, wherein the petroleum-derived hydrocarbon is kerosene.

4. A desulfurizing agent for a petroleum-derived hydrocarbon comprising a silica-alumina carrier, and at least nickel carried on the carrier, wherein the silica-alumina carrier has a Si/Al mole ratio of 10 or less, wherein the desulfurizing agent comprises, on the earner, (A): nickel, (B): copper, and (C): at least one species selected from the group consisting of an alkali metal, an alkaline earth metal, a transition metal, a noble metal, and a rare earth element.

5. A desulfurizing agent for a petroleum-derived hydrocarbon as described in claim 4, wherein the alkali metal is potassium, sodium, or both.

6. A desulfurizing agent for a petroleum-derived hydrocarbon as described in claim 4, wherein the alkaline earth metal is calcium, magnesium, or both.

7. A desulfurizing agent for a petroleum-derived hydrocarbon as described in claim 4, wherein the transition metal is manganese, zinc, or both.

8. A desulfurizing agent for a petroleum-derived hydrocarbon as described in claim 4, wherein the noble metal is at least one species selected from the group consisting of platinum, gold, silver, palladium, ruthenium, and rhodium.

9. A desulfurizing agent for a petroleum-derived hydrocarbon as described in claim 4, wherein the rare earth element is lanthanum, cerium, or both.

10. A desulfurizing agent for a petroleum-derived hydrocarbon comprising a silica-alumina carrier, and at least nickel carried on the carrier, wherein the silica-alumina carrier has a Si/Al mole ratio of 10 or less, the desulfurizing agent comprising a silica-alumina carrier and at least nickel carried on the carrier, wherein the desulfurizing agent has a hydrogen adsorption capacity of at least 0.4 mmol/g.

11. The desulfurizing agent of claim 10, wherein the desulfurizing agent has a specific surface area of pores having a diameter of 3 nm or less of 100 $m^{2/}g$ or more.

12. A desulfurizing agent for a petroleum-derived hydrocarbon comprising a silica-alumina carrier, and at least nickel carried on the carrier, wherein the silica-alumina carrier has a Si/Al mole ratio of 10 or less, wherein the desulfurizing agent contains nickel carried on the carrier in an amount of at least 40 wt. % as reduced to metallic nickel.

13. A method for producing hydrogen for use in a fuel cell comprising desulfurizing a petroleum-derived hydrocarbon by use of a desulfurizing agent comprising a silica-alumina carrier, and at least nickel carried on the carrier, wherein the silica-alumina carrier has a Si/Al mole ratio of 10 or less and, subsequently, bringing the desulfurized product into contact with a steam-reforming catalyst.

14. A method for producing hydrogen for use in a fuel cell as described in claim 13, wherein the steam-reforming catalyst is a ruthenium-based catalyst.

15. A method for producing a desulfurizing agent for a petroleum-derived hydrocarbon, the desulfurizing agent comprising a silica-alumina carrier and nickel carried on the carrier, comprising mixing an acidic aqueous solution or an acidic dispersion having a pH of 2 or less and containing a nickel source and an aluminum source, with a basic aqueous solution containing a silicon source and an inorganic base, to thereby form a solid; collecting the solid; and calcinating the solid; wherein the desulfurizing agent comprising a silica-alumina carrier, and at least nickel carried on the carrier, wherein the silica-alumina carrier has a Si/Al mole ratio of 10 or less.

16. A method for producing a desulfurizing agent as described in claim 15, wherein the inorganic basic solution containing a silicon source and an inorganic base comprises, as the inorganic base, $Na_2CO_3$ or $Na_2CO_3$ and NaOH.

17. A method for producing a desulfurizing agent as described in claim 15, wherein the acidic aqueous solution or the acidic dispersion having a pH of 2 or less and containing a nickel source and an aluminum source, contains, as the aluminum source, at least one species selected from the group consisting of pseudoboebmite, boehmite alumina, and γ-alumina.

18. A method for producing a desulfurizing agent as described in claim 15, wherein calcination is performed at 200-400° C.

19. A method for producing a desulfurizing agent for a petroleum-derived hydrocarbon, the desulfurizing agent comprising a silica-alumina carrier and, carried on the carrier, nickel and copper, comprising mixing an acidic aqueous solution or an acidic aqueous dispersion having a pH of 2 or less and containing a nickel source, a copper source, and a carrier, with a basic aqueous solution containing an inorganic base, to thereby form a solid; collecting the solid; and calcinating the solid.

20. A method for producing a desulfurizing agent for a petroleum-derived hydrocarbon as described in claim 19, the desulfurizing agent comprising a silica-alumina carrier and, carried on the carrier, nickel and copper, comprising mixing an acidic aqueous solution or an acidic aqueous dispersion having a pH of 2 or less and containing a nickel source, a copper source, and a carrier, with a basic aqueous solution containing an inorganic base and a carrier, to thereby form a solid; collecting the solid; and calcinating the solid.

21. A method for producing a desulfurizing agent as described in claim 19, wherein the basic aqueous solution containing an inorganic base contains, as the inorganic base, sodium carbonate, sodium hydroxide, or both sodium carbonate and sodium hydroxide.

22. A method for producing a desulfurizing agent as described in claim 19, wherein calcination is performed at 200-400° C.

* * * * *